United States Patent
Xiao

(10) Patent No.: US 10,185,436 B2
(45) Date of Patent: Jan. 22, 2019

(54) TOUCH APPARATUS, DRIVE CIRCUIT, DRIVE METHOD, AND ELECTRONIC DEVICE

(71) Applicant: FOCALTECH ELECTRONICS, LTD., Cayman Islands (KY)

(72) Inventor: Bei Xiao, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 41 days.

(21) Appl. No.: 15/448,270

(22) Filed: Mar. 2, 2017

(65) Prior Publication Data

US 2017/0255325 A1    Sep. 7, 2017

(30) Foreign Application Priority Data

Mar. 7, 2016 (CN) .......................... 2016 1 0126881

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04105* (2013.01)

(58) Field of Classification Search
CPC .................. G06F 3/0414; G06F 3/044; G06F 2203/04105
See application file for complete search history.

(56) References Cited

U.S. PATENT DOCUMENTS

2016/0005352 A1* 1/2016 Kim ........................ G06F 3/044
345/212
2016/0282999 A1* 9/2016 Hwang ................... G06F 3/044
2018/0018036 A1* 1/2018 Huang .................... G06F 3/044

* cited by examiner

*Primary Examiner* — Lixi C Simpson
(74) *Attorney, Agent, or Firm* — U.S. Fairsky LLP; Yue (Robert) Xu

(57) ABSTRACT

The application provides a touch apparatus, a drive circuit, a drive method and an electronic device. The drive method includes: in a pressure detection stage, providing a first pressure sensing signal to a part of detection electrode, and providing a second pressure sensing signal to the remaining detection electrodes. The first pressure sensing signal is not equal to the second pressure sensing signal. Through detecting a capacitance change between first pressure electrodes and second pressure electrodes, distance changes between a detection conductor and the first pressure electrodes and between the detection conductor and the second pressure electrodes are detected, to realize pressure sensing.

20 Claims, 10 Drawing Sheets

TOUCH APPARATUS, DRIVE CIRCUIT, DRIVE METHOD, AND ELECTRONIC DEVICE

CROSS-REFERENCE TO RELATED APPLICATIONS

This application claims priority to Chinese Patent Application No. 201610126881.0, titled "TOUCH APPARATUS, DRIVE CIRCUIT, DRIVE METHOD, AND ELECTRONIC DEVICE", filed with the Chinese State Intellectual Property Office on Mar. 7, 2016, which is incorporated by reference in its entirety herein.

TECHNICAL FIELD

The present disclosure relates to the field of touch, and in particular to a touch apparatus, a drive circuit of the touch apparatus, a drive method for the touch apparatus, and an electronic device.

BACKGROUND

Smart phones, tablet personal computers and other portable electronic devices are widely used in daily life and work of people, bring a great convenience for life and work of people and even affect the way people live.

With the development of electronic technology, a function requirement on the portable electronic devices is getting higher and higher, and a pressure sensing function becomes a measure to further improve the user experience. After the pressure sensing is realized, information of the pressure dimension may be used to develop the related application functions.

Since a capacitive touch screen has a high sensitivity and supports multi-point touch, it is widely used in the portable electronic devices. How to realize pressure sensing in the capacitive touch screen has become an urgent problem to be solved by those skilled in related fields.

SUMMARY

In order to solve the above problem, the present disclosure provides a touch apparatus, a drive circuit of the touch apparatus, a drive method for the touch apparatus, and an electronic device, to realize pressure sensing in a capacitive touch screen.

In order to solve the above problem, the present disclosure provides a drive method for a touch apparatus to realize pressure sensing. The touch apparatus includes: a detection conductor and multiple detection electrodes arranged in an array. The multiple detection electrodes and the detection conductor are arranged opposite each other to form a capacitor structure, which is configured to sense a touch and a pressure. A stage in which the multiple detection electrodes and the detection conductor perform pressure sensing is defined as a pressure sensing stage. A stage in which the multiple detection electrodes and the detection conductor perform touch sensing is defined as a touch sensing stage. The detection conductor is in a suspended state during the pressure sensing stage.

The drive method includes:
in the pressure sensing stage,
providing a first pressure sensing signal to a part of the multiple detection electrodes, and providing a second pressure sensing signal to the remaining part of the multiple detection electrodes, where the first pressure sensing signal is different from the second pressure sensing signal, detection electrodes receiving the first pressure sensing signal are first pressure electrodes, detection electrodes receiving the second pressure sensing signal are second pressure electrodes, the first pressure electrodes and the detection conductor are configured to form a first capacitor structure, the second pressure electrodes and the detection conductor are configured to form a second capacitor structure, and the first capacitor structure and the second capacitor structure are connected in series;

obtaining a capacitance between the first pressure electrodes and the second pressure electrodes, comparing the capacitance between the first pressure electrodes and the second pressure electrodes with a preset first capacitance, and obtaining a capacitance change value between the first pressure electrodes and the second pressure electrodes as a pressure capacitance change value; and obtaining a pressure signal based on the pressure capacitance change value, to realize pressure sensing; and in the touch sensing stage,
providing a first touch sensing signal to a part of the multiple detection electrodes, and providing a second touch sensing signal to the remaining part of the multiple detection electrodes, where detection electrodes receiving the first touch sensing signal are first touch electrodes, and detection electrodes receiving the second touch sensing signal are second touch electrodes; and performing a self-capacitance detection on the first touch electrodes or the second touch electrodes, or performing a mutual capacitance detection on the first touch electrodes and the second touch electrodes, to realize touch sensing.

Optionally, the drive method further includes: obtaining a capacitance between the first touch electrodes and the second touch electrodes, and obtaining a capacitance change value between the first touch electrodes and the second touch electrodes as a touch capacitance change value based on the capacitance between the first touch electrodes and the second touch electrodes and a preset second capacitance. The step of obtaining a pressure signal includes: obtaining the pressure signal based on the pressure capacitance change value and the touch capacitance change value.

Optionally, the step of realizing pressure sensing includes: determining whether a magnitude of the pressure signal is greater than a preset pressure threshold, and determining that a pressure exists in a case that the magnitude of the pressure signal is greater than the preset pressure threshold.

Optionally, in the step of providing a first pressure sensing signal to the first pressure electrodes and providing a second pressure sensing signal to the second pressure electrodes, the first pressure sensing signal is provided to the first pressure electrodes, to ground the second pressure electrodes. The step of obtaining a capacitance between the first pressure electrodes and the second pressure electrodes includes: detecting a capacitance to ground of the first pressure electrodes. The step of obtaining a pressure capacitance change value includes: comparing the capacitance to ground of the first pressure electrodes with the preset first capacitance, to obtain the pressure capacitance change value.

Optionally, in the step of providing a first touch sensing signal to the first touch electrodes and providing a second touch sensing signal to the second touch electrodes, the first touch sensing signal is equal to the second touch sensing signal.

Optionally, the touch apparatus further includes: discharge electrodes connected with the detection conductor for releasing electric charges. A stage in which the multiple detection electrodes and the detection conductor perform neither pressure sensing nor touch sensing is defined as an idle stage. The drive method further includes: suspending the discharge electrodes during the pressure sensing stage or the touch sensing stage, and grounding the discharge electrodes during the idle stage.

Correspondingly, the present disclosure further provides a drive circuit for a touch apparatus to realize pressure sensing. The touch apparatus includes: a detection conductor and multiple detection electrodes arranged in an array. The multiple detection electrodes and the detection conductor are arranged opposite each other to form a capacitor structure, which is configured to sense a touch and a pressure. A stage in which the multiple detection electrodes and the detection conductor perform pressure sensing is defined as a pressure sensing stage. A stage in which the multiple detection electrodes and the detection conductor perform touch sensing is defined as a touch sensing stage. The detection conductor is in a suspended state during the pressure sensing stage.

The drive circuit includes:

a pressure sensing module, configured to provide a first pressure sensing signal to a part of the multiple detection electrodes, and provide a second pressure sensing signal to the remaining part of the multiple detection electrodes, where the first pressure sensing signal is different from the second pressure sensing signal, detection electrodes receiving the first pressure sensing signal are first pressure electrodes, detection electrodes receiving the second pressure sensing signal are second pressure electrodes, the first pressure electrodes and the detection conductor are configured to form a first capacitor structure, the second pressure electrodes and the detection conductor are configured to form a second capacitor structure, and the first capacitor structure and the second capacitor structure are connected in series; further configured to obtain a capacitance between the first pressure electrodes and the second pressure electrodes, compare the capacitance between the first pressure electrodes and the second pressure electrodes with a preset first capacitance, and obtain a capacitance change value between the first pressure electrodes and the second pressure electrodes as a pressure capacitance change value; and configured to obtain a pressure signal based on the pressure capacitance change value, to realize pressure sensing;

a touch sensing module, configured to provide a first touch sensing signal to a part of the multiple detection electrodes, and provide a second touch sensing signal to the remaining part of the multiple detection electrodes, where detection electrodes receiving the first touch sensing signal are first touch electrodes, and detection electrodes receiving the second touch sensing signal are second touch electrodes; and further configured to perform a self-capacitance detection on the first touch electrodes or the second touch electrodes, or perform a mutual capacitance detection on the first touch electrodes and the second touch electrodes, to realize touch sensing; and a control module, configured to in the pressure sensing stage, control the pressure sensing module to: provide the first pressure sensing signal to the first pressure electrodes, provide the second pressure sensing signal to the second pressure electrodes, obtain the capacitance between the first pressure electrodes and the second pressure electrodes and the pressure capacitance change value, obtain the pressure signal based on the pressure capacitance change value, and realize pressure sensing based on the pressure signal; and configured to in the touch sensing stage, control the touch sensing module to: provide the first touch sensing signal to the first touch electrodes, provide the second touch sensing signal to the second touch electrodes, and perform a self-capacitance detection on the first touch electrodes or the second touch electrodes, or perform a mutual capacitance detection on the first touch electrodes and the second touch electrodes, to realize touch sensing.

Optionally, the touch sensing module is further configured to obtain a capacitance between the first touch electrodes and the second touch electrodes, and obtain a capacitance change value between the first touch electrodes and the second touch electrodes as a touch capacitance change value based on the capacitance between the first touch electrodes and the second touch electrodes and a preset second capacitance. Further, the pressure sensing module is connected with the touch sensing module, and is configured to obtain the touch capacitance change value obtained by the touch sensing module, and to obtain the pressure signal based on the pressure capacitance change value and the touch capacitance change value.

Optionally, the pressure sensing module compares a magnitude of the pressure signal with a preset pressure threshold, and determines that a pressure exists in a case that the magnitude of the pressure signal is greater than the preset pressure threshold.

Optionally, the pressure sensing module includes: a pressure drive unit, configured to provide the first pressure sensing signal to the first pressure electrodes, and provide the second pressure sensing signal to the second pressure electrodes; and a pressure detection unit, configured to obtain the capacitance between the first pressure electrodes and the second pressure electrodes, and obtain the capacitance change value between the first pressure electrodes and the second pressure electrodes as the pressure capacitance change value based on the capacitance between the first pressure electrodes and the second pressure electrodes and the preset first capacitance, and further configured to obtain the pressure signal based on the pressure capacitance change value, to realize pressure sensing.

Optionally, the pressure drive unit includes: a first driver, configured to generate the first pressure sensing signal, and provide the first pressure sensing signal to the first pressure electrodes; and a second driver, configured to generate the second pressure sensing signal, and provide the second pressure sensing signal to the second pressure electrodes.

Optionally, the pressure detection unit includes: a pressure capacitance detector, configured to obtain the capacitance between the first pressure electrodes and the second pressure electrodes; a pressure capacitance comparator, configured to obtain the capacitance change value between the first pressure electrodes and the second pressure electrodes as the pressure capacitance change value based on the capacitance between the first pressure electrodes and the second pressure electrodes and the preset first capacitance; and a pressure detector, configured to obtain the pressure signal based on the pressure capacitance change value, to realize pressure sensing.

Optionally, the second pressure sensing signal is a grounding signal. The pressure capacitance detector detects a capacitance to ground of the first pressure electrodes. The pressure capacitance comparator obtains the pressure capacitance change value based on the capacitance to ground of the first pressure electrodes and the preset first capacitance.

Optionally, the touch sensing module includes: a touch drive unit, configured to provide the first touch sensing signal to the first touch electrodes, and provide the second touch sensing signal to the second touch electrodes; and a touch detection unit, configured to perform a self-capacitance detection on the first touch electrodes or the second touch electrodes, or perform a mutual capacitance detection on the first touch electrodes and the second touch electrodes, to realize touch sensing.

Optionally, the touch sensing module further includes: a touch capacitance detector, configured to obtain the capacitance between the first touch electrodes and the second touch electrodes; and a touch capacitance comparator, configured to obtain the capacitance change value between the first touch electrodes and the second touch electrodes as the touch capacitance change value based on the capacitance between the first touch electrodes and the second touch electrodes and the preset second capacitance. The pressure detector is further configured to obtain the pressure signal based on the pressure capacitance change value and the touch capacitance change value, to realize pressure sensing.

Optionally, the pressure detector includes: a determining element, configured to compare a magnitude of the pressure signal with a preset pressure threshold, and determine that a pressure exists in a case that the magnitude of the pressure signal is greater than the preset pressure threshold.

Optionally, the control module includes: a pressure control unit, configured to in the pressure sensing stage, control the pressure sensing module to: provide the first pressure sensing signal to the first pressure electrodes, provide the second pressure sensing signal to the second pressure electrodes, obtain the capacitance between the first pressure electrodes and the second pressure electrodes and the pressure capacitance change value, and obtain the pressure signal based on the pressure capacitance change value, to realize pressure sensing; and a touch control unit, configured to in the touch sensing stage, control the touch sensing module to: provide the first touch sensing signal to the first touch electrodes, provide the second touch sensing signal to the second touch electrodes, and perform a self-capacitance detection on the first touch electrodes or the second touch electrodes, or perform a mutual capacitance detection on the first touch electrodes and the second touch electrodes, to realize touch sensing.

Optionally, the touch apparatus further includes: discharge electrodes connected with the detection conductor for releasing electric charges. A stage in which the multiple detection electrodes and the detection conductor perform neither pressure sensing a nor touch sensing is defined as an idle stage. The control module further includes a discharge control unit, configured to suspend the discharge electrodes during the pressure sensing stage or the touch sensing stage, and ground the discharge electrodes during the idle stage.

Optionally, the first touch sensing signal is equal to the second touch sensing signal.

Further, the present disclosure provides a touch apparatus, which includes:

a first baseplate and a second baseplate, where the first baseplate and the second baseplate are arranged opposite each other;

a soft support, located between the first baseplate and the second baseplate, and configured to be deformed when the first baseplate or the second baseplate is subjected to an external pressure;

a detection conductor and multiple detection electrodes arranged in an array, located between the first baseplate and the second baseplate, where a distance between the detection conductor and the multiple detection electrodes is changed when the soft support is deformed; and the drive circuit provided according to the present disclosure.

The present disclosure also provides an electronic device, which includes the touch apparatus provided according to the present disclosure.

Compared with the conventional art, the technical solutions according to the present disclosure have the following advantages.

According to the present disclosure in a pressure detection stage, a first pressure sensing signal is provided to a part of the multiple detection electrodes, a second pressure sensing signal is provided to the retaining part of the multiple detection electrodes, and the first pressure sensing signal is different from the second pressure sensing signal. The first pressure electrodes receiving the first pressure sensing signal and the second pressure electrodes receiving the second pressure sensing signal form a capacitor structure. Through detecting a capacitance change of the capacitor structure, distance changes between the detection conductor and the first pressure electrodes and between the detection conductor and the second pressure electrodes are detected, to realize pressure sensing. In addition to touch sensing, the technical solutions according to the present disclosure can realize pressure sensing through providing the voltage change to the multiple detection electrodes, thereby realizing integration of touch sensing and pressure sensing functions without widely changing the device structure, effectively expanding the control capability of the touch apparatus, and further improving the user experience of the touch apparatus.

According to alternative solutions of the present disclosure, the multiple detection electrodes may be electrodes of an integrated display touch apparatus or electrodes of a self-capacitive touch apparatus. The multiple detection electrodes can be used not only for pressure sensing but also for touch sensing, and can realize channel multiplexing of pressure sensing and touch sensing. The channel multiplexing of the pressure sensing and the touch sensing can combine information obtained by the pressure sensing and information obtained by the touch sensing to realize a control function. The information obtained by the pressure sensing can be used to determine whether a touch exists, improve an anti-jamming ability of the touch apparatus, and improve the user experience of the touch function.

According to alternative solutions of the present disclosure, discharge electrodes may be set in the touch apparatus and be connected with the detection conductor, to suspend the discharge electrodes during the pressure sensing stage or the touch sensing stage, and ground the discharge electrodes during the idle stage. The charges on the detection conductor are released when pressure sensing or touch sensing is not performed, avoiding affecting the functionality of the touch apparatus due to the accumulation of electric charges on the detection conductor.

According to alternative solutions of the present disclosure, a first pressure sensing signal is provided to first pressure electrodes, a second pressure sensing signal is provided to second pressure electrodes, to realize pressure sensing. The numbers of the first pressure electrodes and the second pressure electrodes can be adjusted to adjust the relative magnitude of the pressure capacitance and the first capacitance, thereby adjusting a signal-to-noise ratio of the obtained pressure signal, which expands the debugging space of the touch apparatus firmware program.

DETAILED DESCRIPTION OF THE EMBODIMENTS

The specific embodiments of the present disclosure will be described in detail as follows in conjunction with the accompany drawings, so that the above objects, characters and advantages according to the present disclosure can be clearer.

In order to solve the problem mentioned in the background, the present disclosure provides an electronic device.

Figure 1:
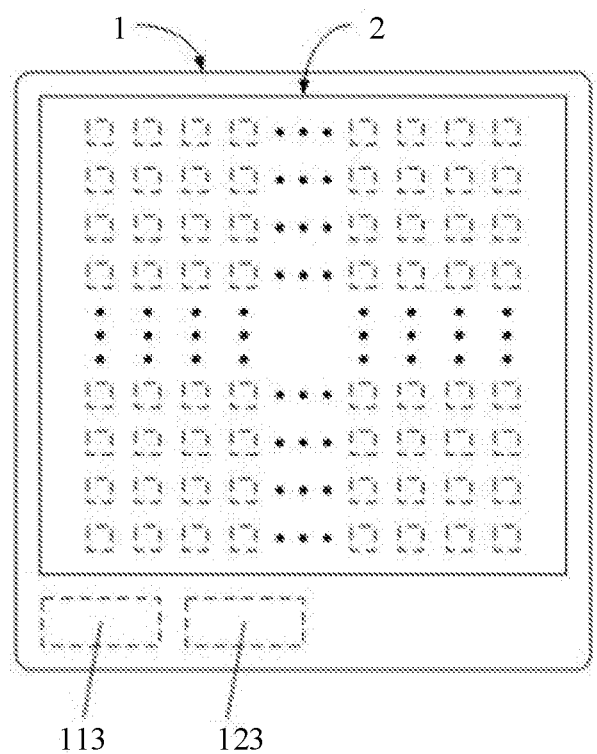
FIG. 1 is a schematic diagram of an electronic device according to an embodiment of the present disclosure.

Referring to FIG. 1, FIG. 1 is a schematic diagram of an electronic device according to an embodiment of the present disclosure.

The electronic device 1 includes a touch apparatus 2, which can sense a touch and a pressure, and a user controls the electronic device 1 through touching and pressing.

A pressure sensing instruction unit 113 and a touch sensing instruction unit 123 may be set in the electronic device 1. The pressure sensing instruction unit 113 is configured to trigger a pressure sensing stage of the touch apparatus 2, so that the touch apparatus 2 performs pressure sensing. The touch sensing instruction unit 123 is configured to trigger a touch sensing stage of the touch apparatus 2, so that the touch apparatus 2 performs touch sensing.

It should be noted that, the position and the form of the pressure sensing instruction unit 113 and the touch sensing instruction unit 123 shown in FIG. 1 are only one example, to which positions and forms of the pressure sensing instruction unit 113 and the touch sensing instruction unit 123 should not be limited.

For example, the electronic device 1 may be provided with a boot apparatus, which is configured to boot the electronic device 1. The boot apparatus may include the pressure sensing instruction unit 113 or the touch sensing instruction unit 123. The pressure sensing instruction unit 113 is configured to trigger the touch apparatus 2 to perform pressure sensing when the electronic device 1 is booted, and the touch sensing instruction unit 12 is configured to trigger the touch apparatus 2 to perform touch sensing when the electronic device 1 is booted.

Or, the electronic device 1 may be provided with an application program apparatus configured to provide an application program. The application program apparatus may include the pressure sensing instruction unit 113 or the touch sensing instruction unit 123. The pressure sensing instruction unit 113 is configured to trigger the touch apparatus 2 to perform pressure sensing when the application program is selected or during use of the application program, and the touch sensing instruction unit 123 is configured to trigger the touch apparatus 2 to perform touch sensing when the application program is selected or during use of the application program.

It should be noted that, whether the pressure sensing instruction unit 113 or the touch sensing instruction unit 123 is provided in the electronic device 1 is not limited in the present disclosure. In other embodiments of the present disclosure, the triggering for pressure sensing or touch sensing of the touch apparatus 2 may be realized otherwise.

Specifically, the electronic device 1 may be a mobile phone, a tablet personal computer, a notebook computer or a desktop computer.

Figure 2:
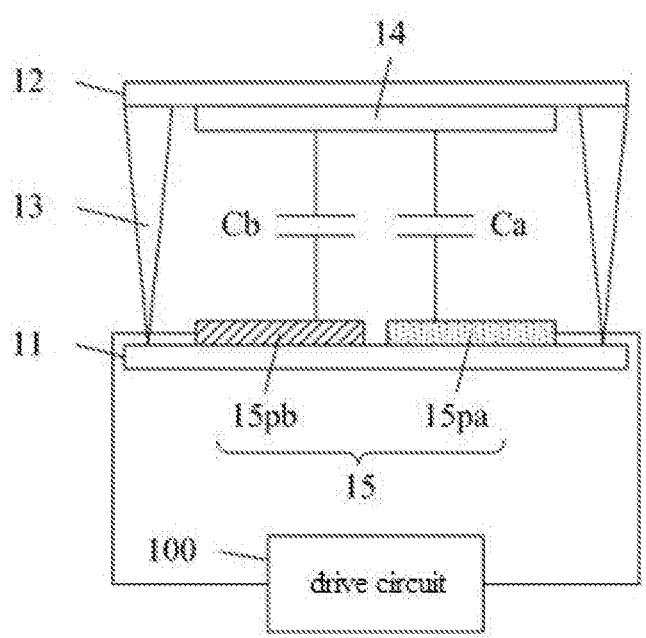
FIGS. 2 to 4 are schematic diagrams of a touch apparatus according to a first embodiment of the present disclosure.
Figure 3:
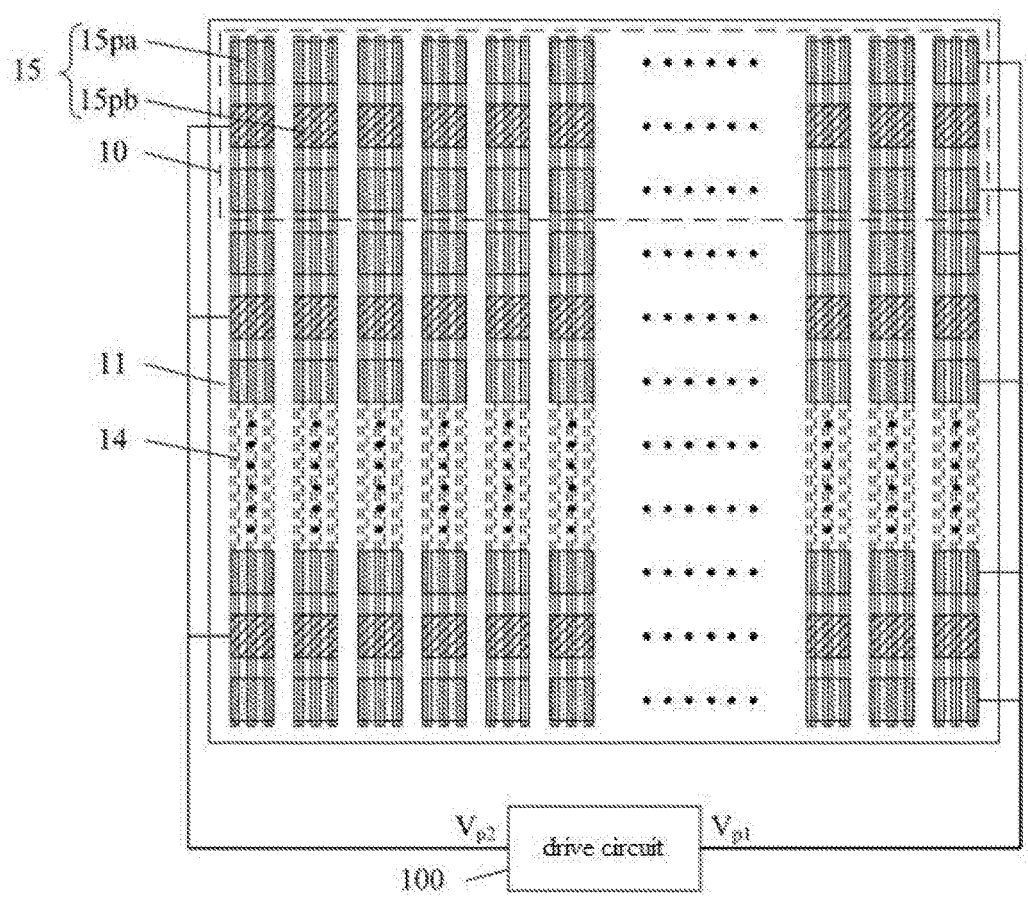
Figure 4:
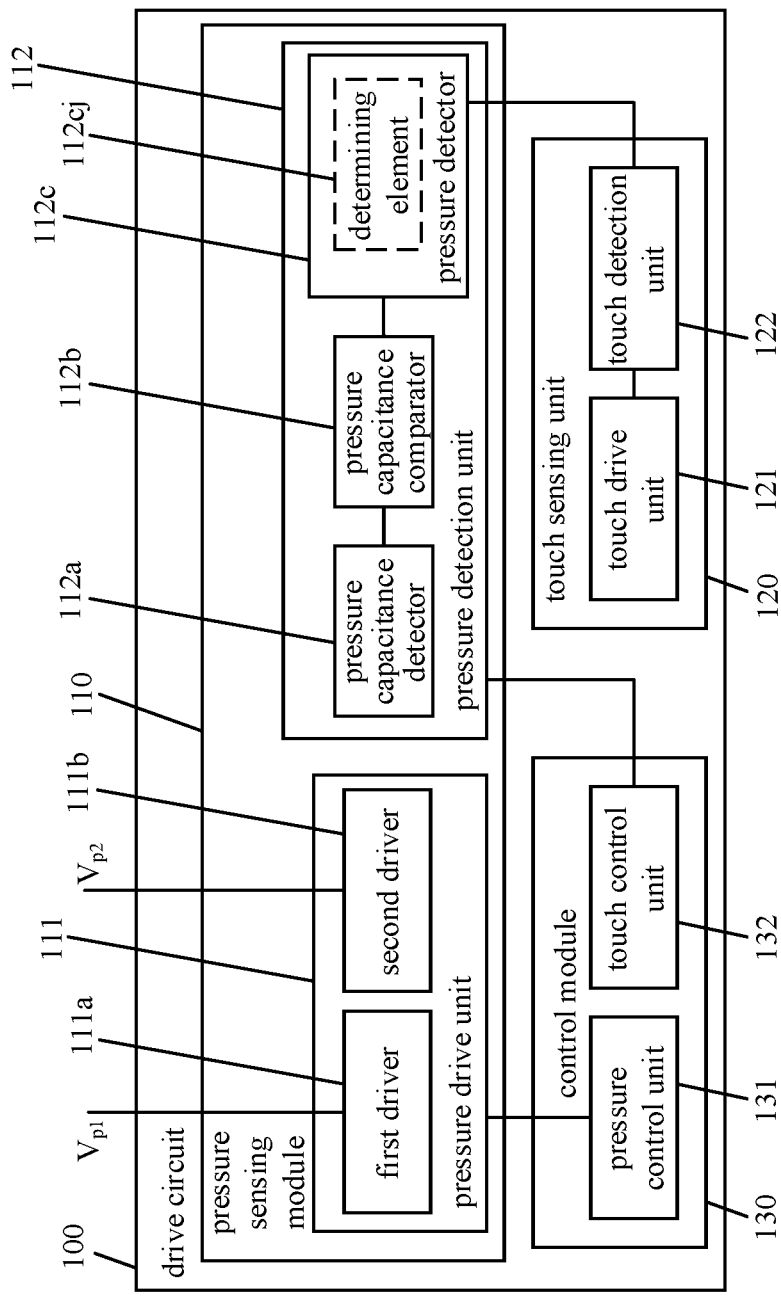

Referring to FIGS. 2 to 4, FIGS. 2 to 4 are schematic diagrams of a touch apparatus according to a first embodiment of the present disclosure.

Referring to FIG. 2, FIG. 2 is a schematic structural diagram of a section view of the touch apparatus according to the present disclosure.

Specifically, the touch apparatus includes: a first baseplate 11, a second baseplate 12, a soft support 13, detection conductors 14 and multiple detection electrodes 15 arranged in an array. The first baseplate 11 and the second baseplate 12 are arranged opposite each other.

In the embodiment, the first baseplate 11 located below is configured to exert a supporting function, and the second baseplate 12 located above is configured to exert a protection function. The first baseplate 11 and the second baseplate 12 are arranged opposite each other, and a gap of a certain thickness is provided between them.

The gap between the first baseplate 11 and the second baseplate 12 may be filled with a gas such as air, and may also be filled with a liquid medium, such as liquid crystal.

The soft support 13 is located between the first baseplate 11 and the second baseplate 12, and is deformed when the first baseplate 11 or the second baseplate 12 is subjected to an external pressure.

The soft support 13 is configured to form a gap of a certain thickness between the first baseplate 11 and the second baseplate 12. In addition, the soft support 13 is deformed when the first baseplate 11 or the second baseplate 12 is subjected to an external pressure, to change a distance between the first baseplate 11 and the second baseplate 12.

The detection conductors 14 and the multiple detection electrodes 15 arranged in an array are located between the first baseplate 11 and the second baseplate 12. A distance between the detection conductors 14 and the multiple detection electrodes 15 is changed when the soft support 13 is deformed.

Specifically, the multiple detection electrodes 15 are located on a surface of the first baseplate 11 facing the second baseplate 12, and the detection conductors 14 are located on a surface of the second baseplate 12 facing the first baseplate 11. The detection conductors 14 and the multiple detection electrodes 15 form a capacitor structure, to sense a touch and a pressure.

As is to be noted, it is only an example that in the embodiment, the detection conductors 14 are located on a surface of the second baseplate 12 facing the first baseplate 11. In other embodiments of the present disclosure, the detection conductor may also be located on a surface of the second baseplate facing away from the first baseplate.

A stage in which the multiple detection electrodes 15 and the detection conductors 14 perform pressure sensing is defined as a pressure sensing stage. A stage in which the multiple detection electrodes 15 and the detection conductors 14 perform touch sensing is defined as a touch sensing stage. The detection conductors 14 are in a suspended state during the pressure sensing stage.

Referring to FIG. 3, FIG. 3 is a schematic top view of the touch apparatus according to the present disclosure, and in FIG. 3 the second baseplate 12 and the soft support 13 are omitted.

In the embodiment, the touch apparatus also includes a detection module 10, which includes three successive rows of detection electrodes 15. The detection conductors 14 each include one or multiple detection wires extending in a column direction, and the three detection wires in succession are connected to form a wire group.

The touch apparatus also includes a drive circuit 100. In the pressure sensing stage, the drive circuit 100 is configured to provide a first pressure sensing signal $V_{p1}$ to a part of the multiple detection electrodes 15, and provide a second pressure sensing signal $V_{p2}$ to the remaining part of the multiple detection electrodes 15. The first pressure sensing signal $V_{p1}$ is not equal to the second pressure sensing signal $V_{p2}$. Detection electrodes 15 receiving the first pressure sensing signal $V_{p1}$ are first pressure electrodes 15pa, detection electrodes 15 receiving the second pressure sensing signal $V_{p2}$ are second pressure electrodes 15pb. The first pressure electrodes 15pa and the detection conductors 14 are configured to form a first capacitor structure Ca, the second pressure electrodes 15pb and the detection conductors 14 are configured to form a second capacitor structure Cb, and the first capacitor structure Ca and the second capacitor structure Cb are connected in series. The drive circuit 100 is further configured to obtain a capacitance between the first pressure electrodes 15pa and the second pressure electrodes 15pb, obtain a capacitance change value between the first pressure electrodes 15pa and the second pressure electrodes 15pb as a pressure capacitance change value ΔCp based on the capacitance between the first pressure electrodes 15pa and the second pressure electrodes 15pb and a preset first capacitance, and obtain a pressure signal based on the pressure capacitance change value ΔCp, to realize pressure sensing.

In addition, in the touch sensing stage, the drive circuit 100 is further configured to provide a first touch sensing signal to a part of the multiple detection electrodes 15, and provide a second touch sensing signal to the remaining part of the multiple detection electrodes 15. Detection electrodes 15 receiving the first touch sensing signal are first touch electrodes, and detection electrodes 15 receiving the second touch sensing signal are second touch electrodes. The drive circuit 100 is further configured to perform a self-capacitance detection on the first touch electrodes or the second touch electrodes, or perform a mutual capacitance detection on the first touch electrodes and the second touch electrodes, to realize touch sensing.

It should be noted that, the electronic device may be booted to trigger the pressure sensing stage. When the electronic device is booted to trigger the pressure sensing stage, the drive circuit 100 provides the first pressure sensing signal $V_{p1}$ to the first pressure electrodes 15pa, and provides the second pressure sensing signal $V_{p2}$ to the second pressure electrodes 15pb. The drive circuit 100 obtains the capacitance between the first pressure electrodes 15pa and the second pressure electrodes 15pb, obtains the pressure capacitance change value ΔCp based on the capacitance between the first pressure electrodes 15pa and the second pressure electrodes 15pb and the preset first capacitance, and obtains the pressure signal based on the pressure capacitance change value ΔCp, to realize pressure sensing.

In addition, the electronic device may be booted to trigger the touch sensing stage. When the electronic device is booted to trigger the touch sensing stage, the drive circuit 100 provides the first touch sensing signal to the first touch electrodes, provides the second touch sensing signal to the second touch electrodes, and performs a self-capacitance detection on the first touch electrodes or the second touch electrodes, or performs a mutual capacitance detection on the first touch electrodes and the second touch electrodes, to realize touch sensing.

Then after the electronic device is powered on, easy operation may be realized though touch sensing or pressure sensing, in which information of the pressure dimension is additionally provided, effectively improving the manipulation function of the touch apparatus, and improving the user experience of the electronic device.

It should also be noted that, other than triggering the pressure sensing stage or the touch sensing stage through booting the electronic device, the pressure sensing stage may also be triggered through a pressure sensing instruction or the touch sensing stage may also be triggered through a touch sensing instruction.

Specifically, a mobile phone is described as an example of an electronic device, and the touch apparatus may be a touch screen of the mobile phone. When the mobile phone is powered on, a touch sensing instruction is provided to the drive circuit 100 at a preset frequency, so that the drive circuit 100 performs touch sensing on the touch screen of the mobile phone at a certain frequency. And when a particular application program in the mobile phone is selected by a click, a pressure sensing instruction is sent to the drive circuit 100, to trigger the pressure sensing stage.

Further, in the pressure sensing stage, in order to improve the accuracy of the pressure sensing, the drive circuit 100 is further configured to obtain a capacitance between the first touch electrodes and the second touch electrodes, and obtain a capacitance change value between the first touch electrodes and the second touch electrodes as a touch capacitance change value based on the capacitance between the first touch electrodes and the second touch electrodes and a preset second capacitance. The drive circuit 100 obtains a pressure signal based on the pressure capacitance change value ΔCp and the touch capacitance change value.

Referring to FIG. 4, FIG. 4 is a functional diagram of the drive circuit 100 in FIG. 2 and FIG. 3.

The drive circuit 100 includes: a pressure sensing module 110, a touch sensing module 120 and a control module 130.

The pressure sensing module 110 is configured to in the pressure sensing stage, provide a first pressure sensing signal $V_{p1}$ to a part of the multiple detection electrodes 15, and provide a second pressure sensing signal $V_{p2}$ to the remaining part of the multiple detection electrodes 15. The first pressure sensing signal $V_{p1}$ is not equal to the second pressure sensing signal $V_{p2}$. Detection electrodes 15 receiving the first pressure sensing signal $V_{p1}$ are first pressure electrodes 15pa, detection electrodes 15 receiving the second pressure sensing signal $V_{p2}$ are second pressure electrodes 15pb. The first pressure electrodes 15pa and the detection conductors 14 are configured to form a first capacitor structure Ca, the second pressure electrodes 15pb and the detection conductors 14 are configured to form a second capacitor structure Cb, and the first capacitor structure Ca and the second capacitor structure Cb are connected in series. The pressure sensing module 110 is further configured to obtain a capacitance between the first pressure electrodes 15pa and the second pressure electrodes 15pb, compare a capacitance between the first pressure electrodes 15pa and the second pressure electrodes 15pb with a preset first capacitance, and obtain a pressure capacitance change value ΔCp between the first pressure electrodes 15pa and the second pressure electrodes 15pb. The pressure sensing module 110 is further configured to obtain a pressure signal based on the pressure capacitance change value ΔCp, to realize pressure sensing.

As shown in FIG. 4, the pressure sensing module 110 includes: a pressure drive unit 111, configured to provide the first pressure sensing signal $V_{p1}$ to the part of the multiple detection electrodes 15, and provide the second pressure sensing signal $V_{p2}$ to the remaining part of the multiple detection electrodes 15.

The pressure drive unit 111 includes: a first driver 111a, configured to generate the first pressure sensing signal $V_{p1}$, and provide the first pressure sensing signal $V_{p1}$ to the part of the multiple detection electrodes 15 (that is, the first pressure electrodes 15pa), and a second driver 111b, configured to generate the second pressure sensing signal $V_{p2}$, and provide the second pressure sensing signal $V_{p2}$ to the remaining part of the multiple detection electrodes 15 (that is, the second pressure electrodes 15pb).

With further reference to FIG. 3, in the embodiment, the first driver 111a provides the first pressure sensing signal $V_{p1}$ to two rows of detection electrodes 15 in the detection module 10, and the second driver 111b provides the second pressure sensing signal $V_{p2}$ to the remaining row of detection electrodes 15 in the detection module 10.

Specifically, the first driver 111a provides the first pressure sensing signal $V_{p1}$ to two rows of detection electrodes 15 located on both sides of the detection module 10, and the second driver 111b provides the second pressure sensing signal $V_{p2}$ to the remaining row of detection electrodes 15 located in the middle of the detection module 10.

That is to say, in the embodiment, two rows of first pressure electrodes 15pa and one row of second pressure electrodes 15pb are provided in a detection module 10, and the two rows of first pressure electrodes 15pa are located on both sides of the one row of second pressure electrodes 15pb.

The first driver 111a provides the first pressure sensing signal $V_{p1}$ to the first pressure electrodes 15pa, to render the first pressure electrodes 15pa at a first potential. The second driver 111b provides the second pressure sensing signal $V_{p2}$ to the second pressure electrodes 15pb, to render the second pressure electrodes 15pb at a second potential. The second pressure sensing signal $V_{p2}$ may be a grounding signal, that is to say, the second driver 111b is configured to ground the second pressure electrodes 15pb.

In the embodiment, the multiple detection electrodes 15 are electrodes of a self-capacitive touch apparatus, and the multiple detection electrodes 15 may be configured in a waterproof mode and a non-waterproof mode. A part of the multiple detection electrodes 15 is configured in the waterproof mode by the first driver 111a, and the remaining part of the multiple detection electrodes 15 is configured in the non-waterproof mode by the second driver 111b.

Continuing with FIG. 4, the pressure sensing module 110 further includes a pressure detection unit 112. The pressure detection unit is configured to obtain the capacitance between the first pressure electrodes 15pa and the second pressure electrodes 15pb, and obtain the pressure capacitance change value ΔCp between the first pressure electrodes 15pa and the second pressure electrodes 15pb based on the capacitance between the first pressure electrodes 15pa and the second pressure electrodes 15pb and the preset first capacitance. The pressure detection unit 112 is further configured to obtain the pressure signal based on the pressure capacitance change value ΔCp, to realize pressure sensing.

Specifically, the pressure detection unit 112 includes: a pressure capacitance detector 112a, configured to obtain the capacitance between the first pressure electrodes 15pa and the second pressure electrodes 15pb, and a pressure capacitance comparator 112b, configured to obtain the capacitance change value ΔCp.

The pressure capacitance detector 112a is connected with the multiple detection electrodes 15 (the first pressure electrodes 15pa and the second pressure electrodes 15pb), to obtain the capacitance between the first pressure electrodes 15pa and the second pressure electrodes 15pb.

In the embodiment, the second pressure sensing signal $V_{p2}$ is a grounding signal, that is to say, the second pressure electrodes 15pb are grounded. Thus, the capacitance between the first pressure electrodes 15pa and the second pressure electrodes 15pb obtained by the pressure capacitance detector 112a is a capacitance to ground of the first pressure electrodes 15pa.

The pressure capacitance comparator 112b is configured to obtain the pressure capacitance change value ΔCp between the first pressure electrodes 15pa and the second pressure electrodes 15pb based on the capacitance between the first pressure electrodes 15pa and the second pressure electrodes 15pb and the preset first capacitance.

Specifically, the pressure capacitance comparator 112b is connected with the pressure capacitance detector 112a. And the pressure capacitance comparator 112b receives the capacitance between the first pressure electrodes 15pa and the second pressure electrodes 15pb obtained by the pressure capacitance detector 112a.

A first capacitance is preset in the pressure capacitance comparator 112b. The first capacitance is a capacitance of a capacitor structure between the first pressure electrodes 15pa and the second pressure electrodes 15pb, when the first baseplate 11 and the second baseplate 12 are not subjected to an external pressure. The pressure capacitance comparator 112b obtains a capacitance change value of the capacitor structure between the first pressure electrodes 15pa and the second pressure electrodes 15pb as the pressure capacitance change value ΔCp based on the capacitance between the first pressure electrodes 15pa and the second pressure electrodes 15pb and the first capacitance.

As shown in FIG. 3, the first pressure electrodes 15pa and the detection conductor 14s form the first capacitor structure Ca, and the second pressure electrodes 15pb and the detection conductor 14 form the second capacitor structure Cb. Since the first pressure sensing signal Vp1 is not equal to the second pressure sensing signal Vp2, a potential of the first pressure electrodes 15pa is not equal to that of the second pressure electrodes 15pb. The first capacitor structure Ca and the second capacitor structure Cb are connected in series to form the capacitor structure between the first pressure electrodes 15pa and the second pressure electrodes 15pb.

When the first baseplate 11 and the second baseplate 12 are subjected to an external pressure, the soft support 13 is deformed, a distance between the detection conductors 14 and the first pressure electrodes 15pa is changed, a distance between the detection conductors 14 and the second pressure electrodes 15pb is changed, and capacitances of the first capacitor structure Ca and the second capacitor structure Cb are changed, thereby changing the capacitance of the capacitor structure between the first pressure electrodes 15pa and the second pressure electrodes 15pb.

Specifically, when the external pressure changes the capacitances of the first capacitor structure Ca and the second capacitor structure Cb by ΔCa and ΔCb, respectively, the capacitance of the capacitor structure, which is formed by connecting the first capacitor structure Ca and the second capacitor structure Cb in series, between the first pressure electrodes 15pa and the second pressure electrodes 15pb changes by ΔC=(ΔCa*ΔCb)/(ΔCa+ΔCb).

Thus, when the external pressure changes the capacitances of the first capacitor structure Ca and the second capacitor structure Cb by ΔCa and ΔCb, respectively, the pressure capacitance comparator 112b may obtain the pressure capacitance change value ΔCp=(ΔCa*ΔCb)/(ΔCa+ΔCb).

Specifically, in the embodiment, the pressure capacitance detector 112a obtains a capacitance to ground of the first pressure electrodes 15pa. Accordingly, the pressure capacitance comparator 112b obtains the pressure capacitance change value ΔCp based on the capacitance to ground of the first pressure electrodes 15pa and the first capacitance.

In addition, the pressure detection unit further includes: a pressure detector 112c, configured to obtain the pressure signal based on the pressure capacitance change value ΔCp, to realize pressure sensing.

The pressure detector 112c is connected with the pressure capacitance comparator 112b, receives the pressure capacitance change value ΔCp obtained by the pressure capacitance comparator 112b, and generates the pressure signal based on the pressure capacitance change value ΔCp, to realize pressure sensing.

In the embodiment, the pressure detector 112c determines whether a pressure exists through comparing a magnitude of the pressure signal with a preset pressure threshold. Specifically, the pressure detector 112c further includes a determining element 112cj, configured to compare a magnitude of the pressure signal with the preset pressure threshold, and determine that a pressure exists in a case that the magnitude of the pressure signal is greater than the preset pressure threshold. In an electronic device with the touch apparatus, an application may be further developed based on the determination whether a pressure exists, to realize the utilization information in the pressure dimension.

As should be noted, it is only an example that, in the embodiment, the pressure detector 112c realizes pressure sensing through determine whether a pressure exists. In other embodiments of the present disclosure, the pressure detector also may realize pressure sensing through sensing the magnitude of the pressure. Different applications may be developed for an electronic device with the touch apparatus depending on different pressures, to realize further development and utilization of information in the pressure dimension.

The drive circuit 100 further includes: a touch sensing module 120, configured to provide a first touch sensing signal to a part of the multiple detection electrodes 15, and provide a second touch sensing signal to the remaining part of the multiple detection electrodes 15. And detection electrodes 15 receiving the first touch sensing signal are first touch electrodes, and detection electrodes 15 receiving the second touch sensing signal are second touch electrodes. The touch sensing module 120 is further configured to perform a self-capacitance detection on the first touch electrodes or the second touch electrodes, or perform a mutual capacitance detection on the first touch electrodes and the second touch electrodes, to realize touch sensing.

Specifically, the touch sensing module 120 includes: a touch drive unit 121, configured to provide the first touch sensing signal to the part of the multiple detection electrodes 15, and provide the second touch sensing signal to the remaining part of the multiple detection electrodes 15.

The touch drive unit 121 generates the first touch sensing signal and the second touch sensing signal, is connected with the multiple detection electrodes 15 (the first touch electrodes or the second touch electrodes), provides the first touch sensing signal to the part of the multiple detection electrodes 15 (the first touch electrodes), and provides the second touch sensing signal to the remaining part of the multiple detection electrodes 15 (the second touch electrodes). The first touch electrodes are rendered at a first potential by the first touch sensing signal, and the second touch electrodes are rendered at a second potential by the second touch sensing signal.

It should be noted that, in the embodiment, the first touch sensing signal is equal to the second touch sensing signal. Thus in the touch sensing stage, a potential of the first touch electrodes is equal to that of the second touch electrodes.

The touch sensing module 120 further includes: a touch detection unit 122, configured to perform a self-capacitance detection on the first touch electrodes or the second touch electrodes, or perform a mutual capacitance detection on the first touch electrodes and the second touch electrodes, to realize touch sensing.

Specifically, the touch detection unit 122 is connected with the multiple detection electrodes 15, and performs a self-capacitance detection on the multiple detection electrodes 15 (the first touch electrodes or the second touch electrodes), or performs a mutual capacitance detection on the first touch electrodes and the second touch electrodes, to realize touch sensing.

A touch screen of a mobile phone is described as an example of the touch apparatus. When the touch screen is touched with a finger, the multiple detection electrodes 15 are grounded through the human body as the human body is grounded. Therefore, touching sensing can be realized by performing a self-capacitance detection on the multiple detection electrodes 15 or a mutual capacitance detection on the first touch electrodes and the second touch electrodes.

It should also be noted that, the pressure sensing stage or the touch sensing stage may be triggered by booting, the pressure sensing stage may also be triggered by a pressure sensing instruction or the touch sensing stage may also be triggered by a touch sensing instruction. In the embodiment, the drive circuit 100 controls the pressure sensing module 110 and the touch sensing module 120 by the control module 130.

Specifically, the drive circuit 100 further includes a control module 130. In the pressure sensing stage, the control module 130 is configured to control the pressure sensing module to: provide the first pressure sensing signal $V_{p1}$ to the part of the multiple detection electrodes 15, provide the second pressure sensing signal $V_{p2}$ to the remaining part of the multiple detection electrodes 15, obtain the capacitance between the first pressure electrodes 15pa and the second pressure electrodes 15pb and the pressure capacitance change value ΔCp, obtain the pressure signal based on the pressure capacitance change value ΔCp, and realize pressure sensing based on the pressure signal. And in the touch sensing stage, the control module 130 is configured to control the touch sensing module to: provide the first touch sensing signal to the part of the multiple detection electrodes 15, provide the second touch sensing signal to the remaining part of the multiple detection electrodes 15, and perform a self-capacitance detection on the first touch electrodes or the second touch electrodes, or perform a mutual capacitance detection on the first touch electrodes and the second touch electrodes, to realize touch sensing.

Specifically, the control module 130 includes a pressure control unit 131 and a touch control unit 132. The pressure control unit 131 is configured to in the pressure sensing stage, control the pressure sensing module to: provide the first pressure sensing signal $V_{p1}$ to the part of the multiple detection electrodes 15, provide the second pressure sensing signal $V_{p2}$ to the remaining part of the multiple detection electrodes 15, obtain the capacitance between the first pressure electrodes 15pa and the second pressure electrodes 15pb and the pressure capacitance change value ΔCp, and obtain the pressure signal based on the pressure capacitance change value ΔCp, to realize pressure sensing.

And the touch control unit 132 is configured to in the touch sensing stage, control the touch sensing module to: provide the first touch sensing signal to the part of the multiple detection electrodes 15, provide the second touch sensing signal to the remaining part of the multiple detection electrodes 15, and perform a self-capacitance detection on the first touch electrodes or the second touch electrodes, or perform a mutual capacitance detection on the first touch electrodes and the second touch electrodes, to realize touch sensing.

It is noted that, a clock unit may be set in the control module 130, so that the control module 130 controls the pressure sensing module 110 to periodically perform pressure sensing according to a certain frequency, and the control module 130 also controls the touch sensing module 120 to periodically perform touch sensing according to a certain frequency, thereby realizing scan of touch and pressure, and improving the user experience of the touch apparatus.

It is further noted that, in the embodiment, the multiple detection electrodes 15 sense a pressure in the pressure sensing stage, sense a touch in the touch sensing stage, and can realize channel multiplexing of pressure sensing and touch sensing. Therefore, in the embodiment, the accuracy of pressure sensing performed by the touch apparatus can reach the accuracy of touch sensing in the conventional art, and the accuracy of pressure sensing is effectively improved.

Further, since the touch apparatus can realize channel multiplexing of pressure sensing and touch sensing, the combination of the touch sensing control and the pressure sensing control can be realized, and the performance of the touch apparatus can be effectively improved. For example, the touch apparatus can improve the sensing performance, in a case that a touch signal of a passive pen or a touch with a glove is weak, through the pressure sensing function. In particular, the passive pen has a stronger and more stable signal in the case of pressure sensing than in the case of touch sensing, so the signal-to-noise ratio can be effectively improved, and the pressure sensing function can provide an effective assistance function for the touch sensing function. In addition, the channel multiplexing of pressure sensing and touch sensing can enable the touch apparatus to realize the detection of the pressure magnitude of the passive pen, providing possibility for developing a touch function for the passive pen. Further, in a complicated environment such as underwater, the pressure sensing can be directly used to realize the control function, thereby providing convenience for the touch apparatus in the complicated environment, and improving the anti-jamming capability of the touch apparatus.

Figure 5:
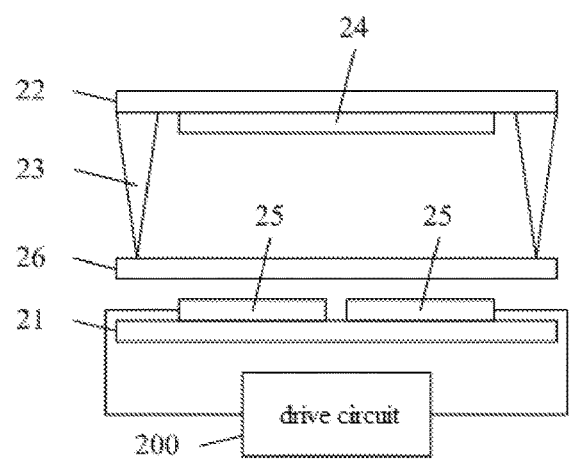
FIGS. 5 to 7 are schematic diagrams of a touch apparatus according to a second embodiment of the present disclosure.
Figure 6:
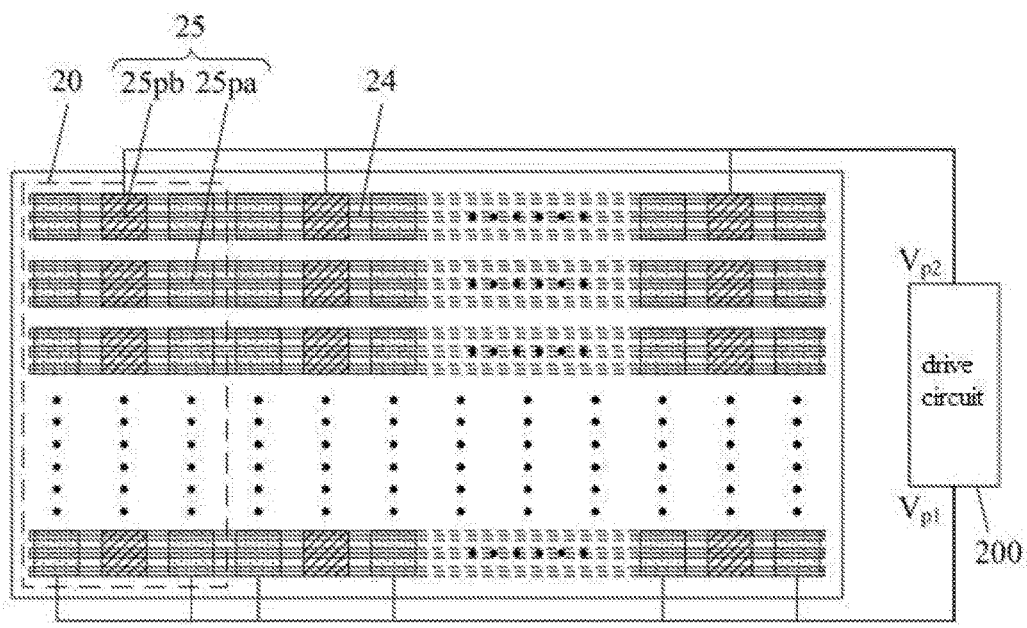
Figure 7:
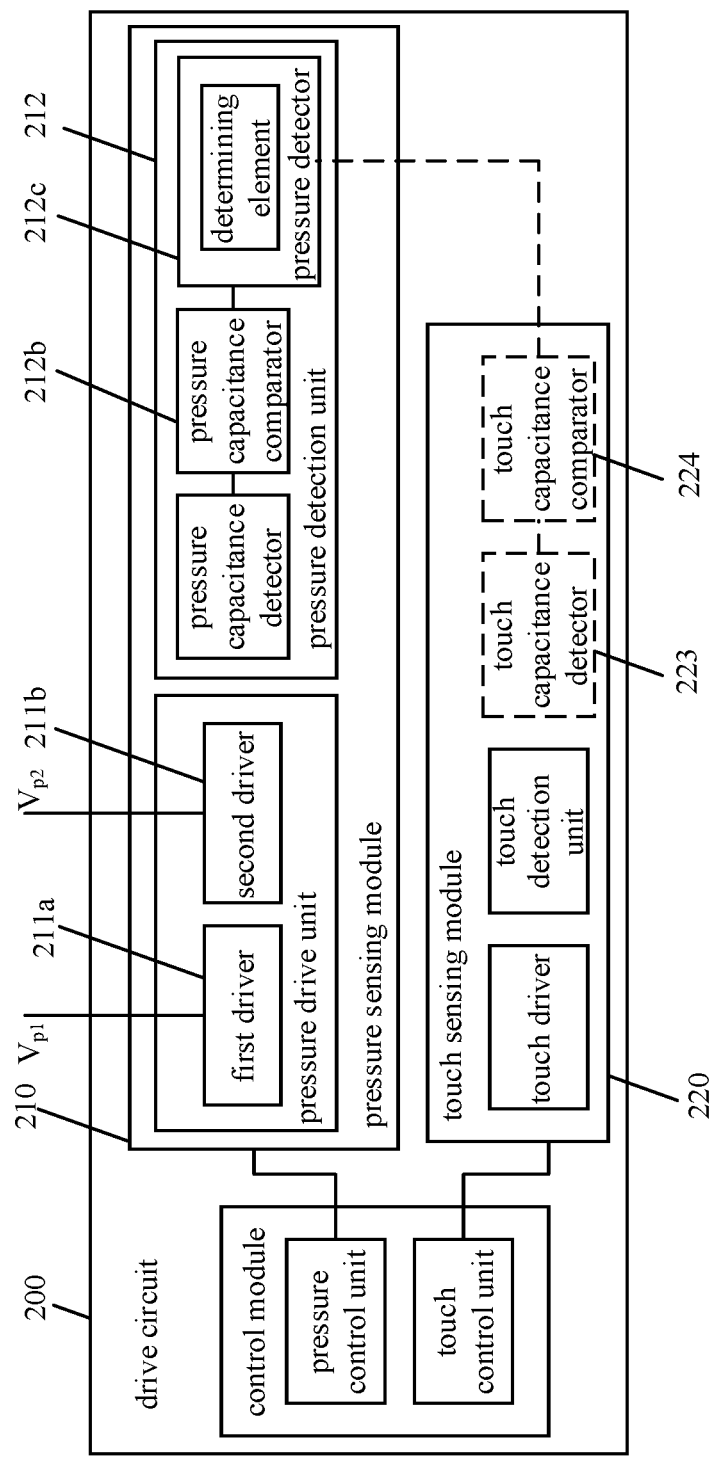

Referring to FIGS. 5 to 7, FIGS. 5 to 7 are schematic diagrams of a touch apparatus according to a second embodiment of the present disclosure.

Referring to FIG. 5, FIG. 5 is a schematic sectional view of the touch apparatus.

In the embodiment, the touch apparatus further includes: a third baseplate 26 provided between a first baseplate 21 and a second baseplate 22. In the embodiment, multiple detection electrodes 25 are provided on a surface of the first baseplate 21, a soft support 23 is provided between the third baseplate 26 and the second baseplate 22, and detection conductors 24 are provided on a surface of the second baseplate 22 facing the first baseplate 21.

The soft support 23 is deformed when the first baseplate 21 or the second baseplate 22 is subjected to an external pressure, to change a distance between the third baseplate 26 and the second baseplate 22, thereby changing a distance between the detection conductors 24 and the multiple detection electrodes 25.

It is to be noted that in the embodiment, positions of the multiple detection electrodes 25, the detection conductors 24 and the soft support are only one example. In other embodiments of the present disclosure, the multiple detection electrodes may also be located on a surface of the third baseplate facing the second baseplate, the soft support may be located between the third baseplate and the first baseplate, and the detection conductors may be located on a surface of the first baseplate facing away from the second baseplate. When the first baseplate or the second baseplate is subjected to an external pressure, a distance between the detection conductors and the multiple detection electrodes is changed, to realize pressure sensing.

In addition, referring to FIG. 6, FIG. 6 is a schematic top view of the touch apparatus, in which the second baseplate 22, the third baseplate 26 and the soft support 23 are omitted.

In the embodiment, the touch apparatus also includes a detection module 20, which includes three successive columns of detection electrodes 25. The detection conductors 24 each include one or multiple detection wires extending in a row direction.

Referring to FIG. 7, FIG. 7 is a functional diagram of a drive circuit 200 in FIG. 5 and FIG. 6.

In the embodiment, a first driver 211a provides a first pressure sensing signal $V_{p1}$ to two columns of detection electrodes 25 in the detection module 20, and a second driver 211b provides a second pressure sensing signal $V_{p2}$ to the remaining column of detection electrodes 25 in the detection module 20.

Specifically, the first driver 211a provides the first pressure sensing signal $V_{p1}$ to two columns of detection electrodes 25 located on both sides of the detection module 20, and the second driver 211b provides the second pressure sensing signal $V_{p2}$ to the remaining column of detection electrodes 25 located in the middle of the detection module 20.

That is to say, in the embodiment, a detection module 20 includes two columns of first pressure electrodes 25pa and one column of second pressure electrodes 25pb, and the two columns of first pressure electrodes 25pa are located on both sides of the one column of second pressure electrodes 25pb.

In addition, in the embodiment, the multiple detection electrodes 25 are electrodes of an integrated display touch apparatus (Integrated Display Control). Therefore, the multiple detection electrodes 25 may be configured in a full-drive mode, a high-impedance (High-Z) mode, and a ground (GND) mode. The first pressure electrodes 25*pa* are configured in the full-drive mode by the first driver 211*a*, and the second pressure electrodes 25*pb* are configured in the ground mode by the second driver 211*b*.

Further, in the embodiment, in order to improve the accuracy of the touch apparatus for pressure sensing, a touch sensing module 220 is configured to obtain a capacitance between first touch electrodes and second touch electrodes, and obtain a capacitance change value between the first touch electrodes and the second touch electrodes as a touch capacitance change value based on the capacitance between the first touch electrodes and the second touch electrodes and a preset second capacitance. A pressure sensing module 210 is connected with the touch sensing module 220, and configured to obtain the touch capacitance change value obtained by the touch sensing module 220, and obtain a pressure signal based on a pressure capacitance change value ΔCp and the touch capacitance change value.

Accordingly, the touch sensing module 220 further includes: a touch capacitance detector 223, configured to obtain the capacitance between the first touch electrodes and the second touch electrodes, and a touch capacitance comparator 224, configured to obtain the touch capacitance change value.

The touch capacitance detector 223 is connected with the multiple detection electrodes 25 (the first touch electrodes and the second touch electrodes). And the touch capacitance detector 223 obtains the capacitance between the first touch electrodes and the second touch electrodes.

The touch capacitance comparator 224 is configured to obtain the capacitance change value between the first touch electrodes and the second touch electrodes as the touch capacitance change value based on the capacitance between the first touch electrodes and the second touch electrodes and the preset second capacitance.

Specifically, the touch capacitance comparator 224 is connected with the touch capacitance detector 223. And the touch capacitance comparator 224 receives the capacitance between the first touch electrodes and the second touch electrodes obtained by the touch capacitance detector 223.

A second capacitance is preset in the touch capacitance comparator 224. The second capacitance is a capacitance of a capacitor structure between the first touch electrodes and the second touch electrodes, when the touch apparatus is not touched. The touch capacitance comparator 224 obtains a capacitance change value of the capacitor structure between the first touch electrodes and the second touch electrodes as the touch capacitance change value based on the capacitance of the capacitor structure between the first touch electrodes and the second touch electrodes and the second capacitance.

In the embodiment, a pressure detector 212*c* is further configured to obtain a pressure signal based on the pressure capacitance change value ΔCp and the touch capacitance change value, to realize pressure sensing.

Specifically, the pressure detector 212*c* is connected with a pressure capacitance comparator 212*b*, and obtains the pressure capacitance change value ΔCp. The pressure detector 212*c* is further connected with the touch capacitance comparator 224, and obtains the touch capacitance change value.

For example, a 100 g pressure is adopted to test the touch apparatus. When the first pressure electrodes 25*pa* and the second pressure electrodes 25*pb* are all set to the full-drive mode, a capacitance change value generated by a touch is greater than or equal to 800 mF, and a capacitance change value generated by the pressure is less than or equal to 300 mF. When the first pressure electrodes 25*pa* are set to the full-drive mode and the second pressure electrodes 25*pb* are set to the ground mode, a capacitance change value generated by a touch is less than or equal to 500 mF, and a capacitance change value generated by the pressure is greater than or equal to 9000 mF. It can be seen that, through comparing the pressure capacitance change value ΔCp and the touch capacitance change value, the interference of touch on pressure sensing can be avoided, improving the accuracy of pressure sensing.

In the embodiment, the pressure detector 212*c* obtains the pressure signal based on the pressure capacitance change value ΔCp and the touch capacitance change value, to realize pressure sensing. The pressure signal is obtained based on the pressure capacitance change value ΔCp and the touch capacitance change value, so that in a process of pressure sensing, the interference of finger touch on the pressure signal can be avoided, thereby improving the accuracy of pressure sensing.

Figure 8:
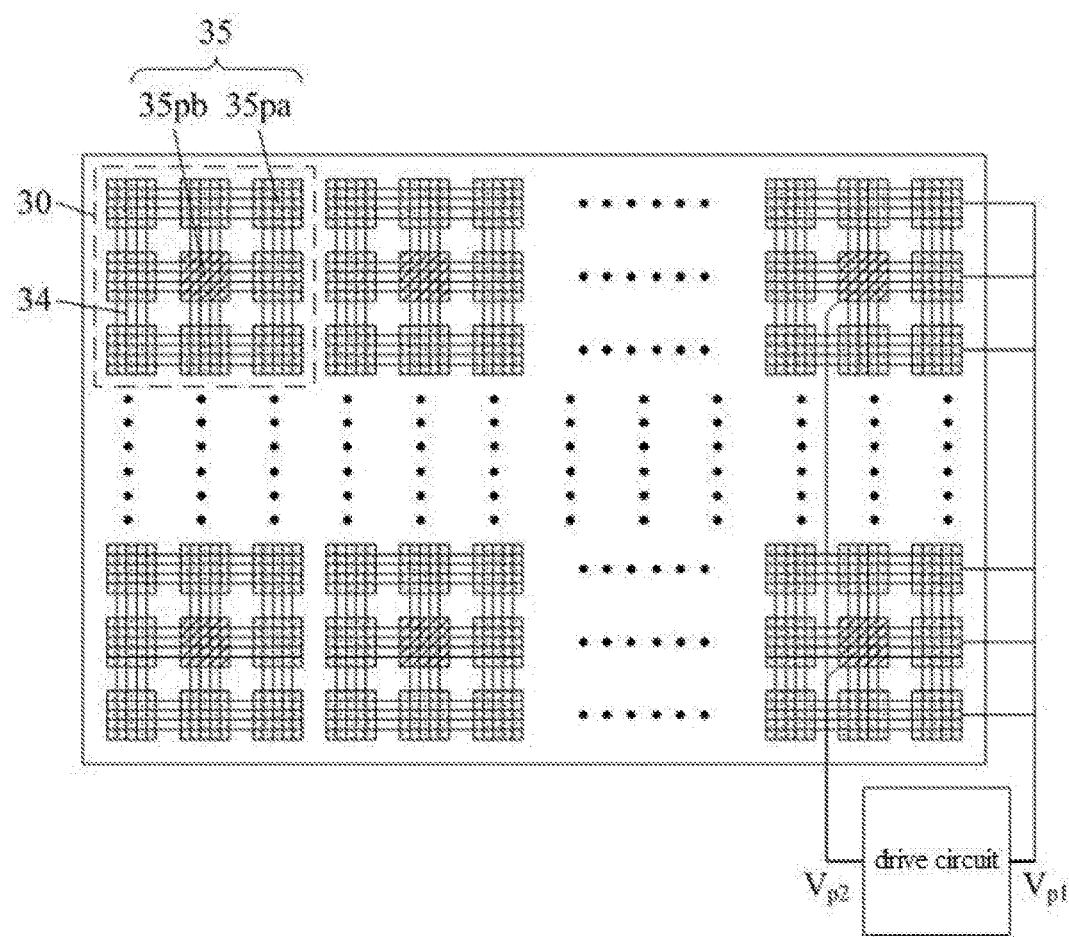
FIG. 8 is a schematic diagram of a touch apparatus according to a third embodiment of the present disclosure.

Referring to FIG. 8, FIG. 8 is a schematic diagram of a touch apparatus according to a third embodiment of the present disclosure. It should be noted that, a second baseplate and a soft support are omitted in FIG. 8.

In the embodiment, the touch apparatus further includes: a detection module 30, which includes 3×3 detection electrodes 35 and a detection conductor 34. And the detection conductor 34 includes one or multiple first detection wires across three columns of the detection electrodes 35 in the detection module 30 in a row direction, and one or multiple second detection wires across three rows of the detection electrodes 35 in the detection module 30 in a column direction.

In the embodiment, a second driver provides a second pressure sensing signal $V_{p2}$ to one of the detection electrodes 35 in the detection module 30, and a first driver provides a first pressure sensing signal $V_{p1}$ to the remaining electrodes of the detection electrodes 35 in the detection module 30.

Specifically, the second driver provides the second pressure sensing signal $V_{p2}$ to one of the detection electrodes 35 located in the center of the detection module 30, and the first driver provides the first pressure sensing signal $V_{p1}$ to detection electrodes 35 located in the surrounding of the detection module 30.

That is to say, in the embodiment, nine detection electrodes 35 are arranged in a 3×3 matrix to form the detection module 30. And the nine detection electrodes 35 include eight first pressure electrodes 35*pa* and one second pressure electrode 35*pb*, and the eight first pressure electrodes 35*pa* are located around the one second pressure electrode 35*pb*.

It should be noted that, in the first and second embodiments, a ratio of the number of the first pressure electrodes to that of the second pressure electrodes is 2:1. In the embodiment, a radio of the number of the first pressure electrodes 35*pa* to that of the second electrodes 35*pb* is 8:1. When external pressures received are equal, and changes of the distance between the detection conductor and first pressure electrodes, and between the detection conductor and second pressure electrodes are equal, in the embodiment, a pressure capacitance change value ΔCp is greater, a obtained pressure signal is thus stronger, and a signal-to-noise ratio is higher. Thus, the numbers of the first pressure electrodes and the second pressure electrodes can be adjusted to adjust a magnitude of a pressure capacitance relative to the first capacitance, thereby adjusting a signal-to-noise ratio of the obtained pressure signal. As the signal-to-noise ratio of the pressure signal is adjustable, the debugging space of the touch apparatus firmware program is expanded.

Further, the detection electrodes 35 are drive electrodes or reception electrodes of a mutual capacitance touch apparatus. The reception electrodes are the first pressure electrodes 35pa, and the drive electrodes are the second pressure electrodes 35pb. The first driver provides the first pressure sensing signal $V_{p1}$ to the reception electrodes, and the second driver provides the second pressure sensing signal $V_{p2}$ to the drive electrodes.

Figure 9:
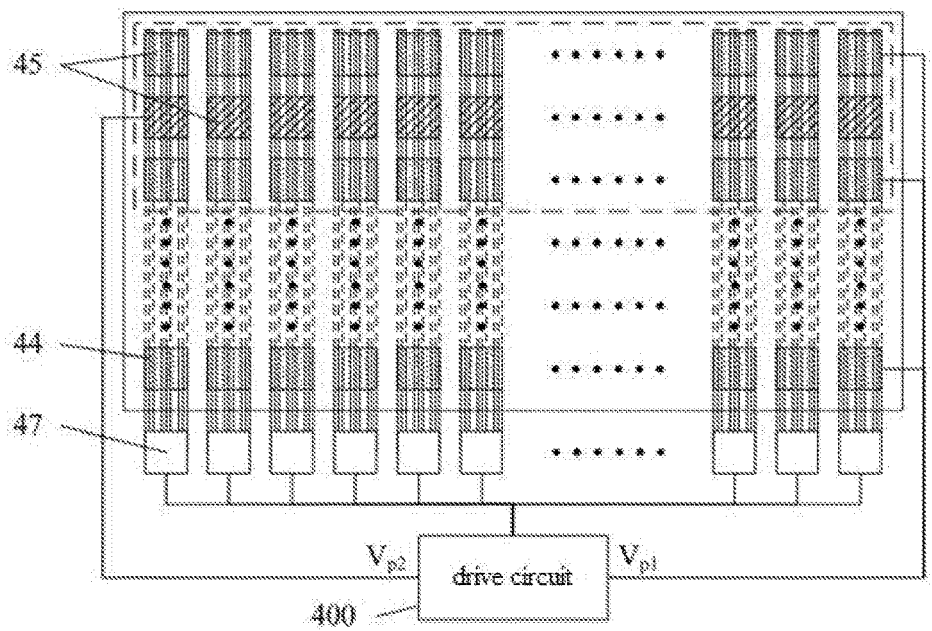
FIG. 9 and FIG. 10 are schematic diagrams of a touch apparatus according to a fourth embodiment of the present disclosure.
Figure 10:
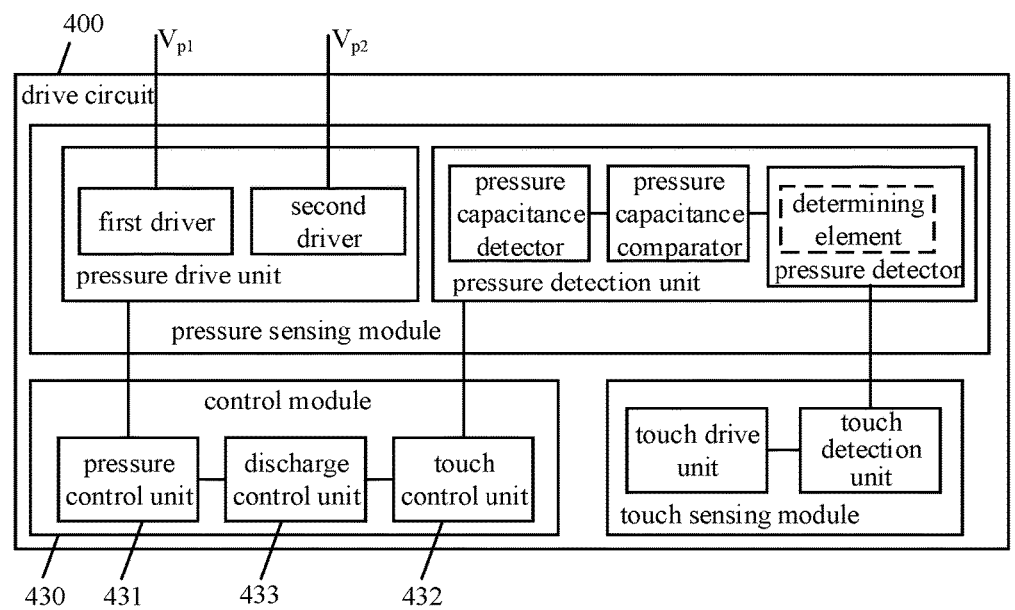

Referring to FIGS. 9 and 10, FIGS. 9 and 10 are schematic diagrams of a touch apparatus according to a fourth embodiment of the present disclosure.

Referring to FIG. 9, FIG. 9 is a schematic top view of the touch apparatus, in which a second baseplate and a soft support are omitted.

In the embodiment, the touch apparatus further includes: discharge electrodes 47 connected to detection conductors 44 for releasing electric charges. A stage in which multiple detection electrodes 45 and the detection conductor 44 perform neither pressure sensing nor touch sensing is defined as an idle stage. The discharge electrodes 47 are suspended during a pressure sensing stage or a touch sensing stage, and grounded during the idle stage.

In the pressure sensing stage or the touch sensing stage, the detection conductors 44 are in a suspended state. There is a charge accumulation phenomenon in the suspended detection conductors 44, thereby affecting the practical function of the touch apparatus. Taking a touch screen of a mobile phone for example, when there is a charge accumulation phenomenon in the suspended detection conductors 44 of the touch screen of the mobile phone, a display function of the touch screen of the mobile phone is affected.

As shown in FIG. 9, in the embodiment, the detection conductors 44 each include one or multiple detection wires extending in a column direction. The discharge electrodes 47 are located, in a row direction, at one or both sides of an array formed by the multiple detection electrodes 45, and are each connected with the one or multiple detection wires. When the discharge electrodes 47 are grounded in the idle stage, the detection conductors 44 can release the accumulated charges to the ground through the discharge electrodes 47.

It should be noted that, it is merely an example that the discharge electrodes 47 are located, in a row direction, at one or both sides of the array formed by the multiple detection electrodes 45. In other embodiments of the present disclosure, the discharge electrodes 47 may also be set on other positions of the touch apparatus. In a case that the detection conductors 44 include one or multiple detection wires extending in a row direction, the discharge electrodes 47 may be located, in a column direction, at one or both sides of the array formed by the multiple detection electrodes 45, and may be each connected with the one or multiple detection wires.

Referring to FIG. 10, FIG. 10 is a functional diagram of a drive circuit 400 in FIG. 9.

In the embodiment, the drive circuit 400 is connected with the discharge electrodes 47. The drive circuit 400 is configured to ground the discharge electrodes 47 during the idle stage, and further configured to suspend the discharge electrodes 47 during the pressure sensing stage or the touch sensing stage.

Specifically, a control module 430 further includes a discharge control unit 433, configured to suspend the discharge electrodes 47 during the pressure sensing stage or the touch sensing stage and ground the discharge electrodes 47 during the idle stage.

Specifically, the discharge control unit 433 is connected with the discharge electrodes 47. The discharge control unit 433 generates a suspending signal and provides the suspending signal to the discharge electrodes 47, so that the discharge electrodes 47 are suspended. The discharge control unit 433 also generates a grounding signal and provides the grounding signal to the discharge electrodes 47, so that the discharge electrodes 47 are grounded.

In addition, the discharge control unit 433 is connected with a pressure control unit 431 and a touch control unit 432. And the discharge control unit 433 is configured to generate the suspending signal in the pressure sensing stage or the touch sensing stage, and further configured to generate the grounding signal in the idle stage.

Figure 11:
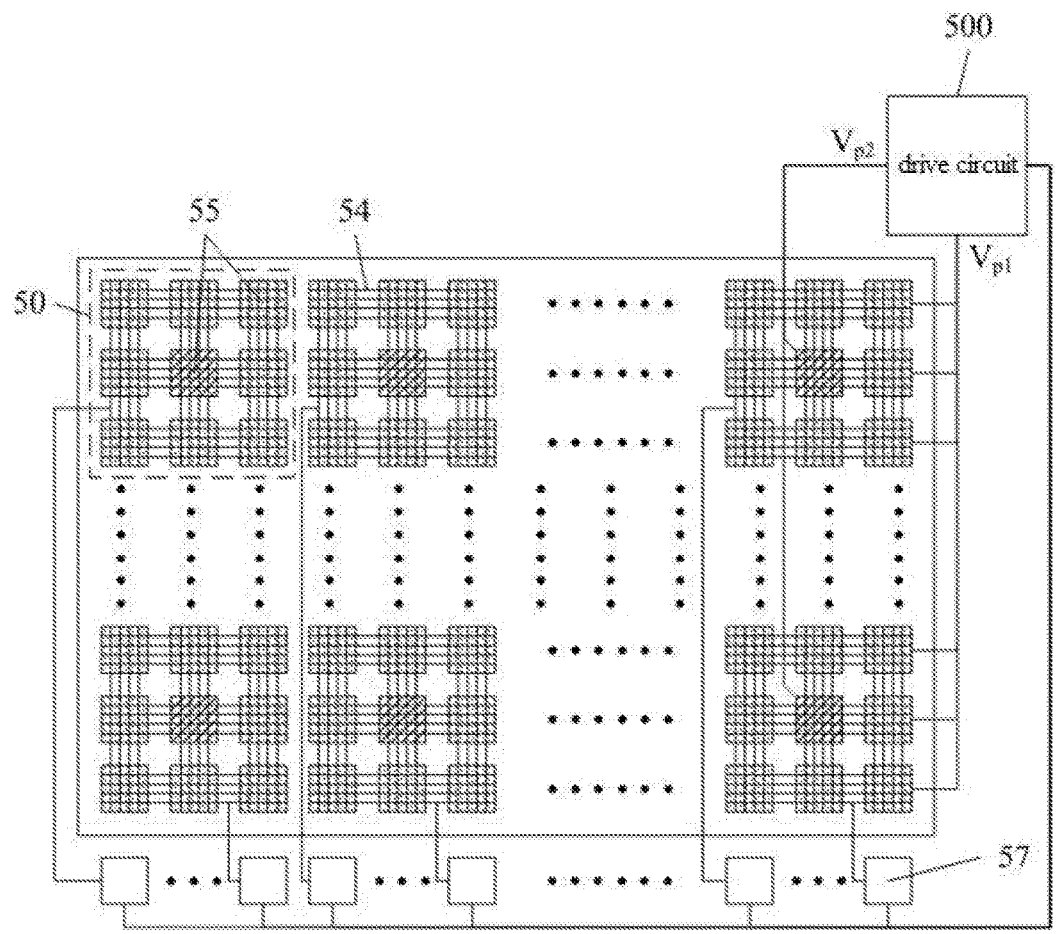
FIG. 11 is a schematic diagram of a touch apparatus according to a fifth embodiment of the present disclosure.

Referring to FIG. 11, FIG. 11 is a schematic diagram of a touch apparatus according to a fifth embodiment of the present disclosure. It should be noted that, in FIG. 11 a second baseplate and a soft support are omitted.

The similarities between the embodiment and the foregoing embodiments are not repeated herein. The differences between the embodiment and the foregoing embodiments are described as follows. The touch apparatus includes a detection module 50, which includes 3×3 detection electrodes 55. The detection conductors 54 each include one or multiple first detection wires across three columns of detection electrodes 55 in the detection module 50 in a row direction, and one or multiple second detection wires across three rows of detection electrodes 55 in the detection module 50 in a column direction. Discharge electrodes 57 are connected in a one-to-one correspondence with the detection conductors 54 in the detection module 50. The detection conductors 54 in the detection module 50 are grounded in the idle stage through the discharge electrode 57 to release the charges.

Correspondingly, the present disclosure also provides a drive method for a touch apparatus to realize pressure sensing. The technical solutions of the present disclosure will be described in detail as follows in conjunction with the accompany drawings.

Referring to FIG. 3, FIG. 3 is a schematic structural diagram of a touch apparatus to which a drive method for a touch apparatus to realize pressure sensing according to an embodiment of the present disclosure is applied.

The touch apparatus includes: detection conductors 14 and multiple detection electrodes 15 arranged in an array. The multiple detection electrodes 15 and the detection conductors 14 are arranged opposite each other to form a capacitor structure, which is configured to sense a touch and a pressure. A stage in which the multiple detection electrodes 15 and the detection conductors 14 perform pressure sensing is defined as a pressure sensing stage. A stage in which the multiple detection electrodes 15 and the detection conductors 14 perform touch sensing is defined as a touch sensing stage. The detection conductors 14 are in a suspended state during the pressure sensing stage.

The drive method includes the following steps.

In the pressure sensing stage, a first pressure sensing signal $V_{p1}$ is provided to a part of the multiple detection electrodes 15, and a second pressure sensing signal $V_{p2}$ is provided to the remaining part of the multiple detection electrodes 15. The first pressure sensing signal $V_{p1}$ is not equal to the second pressure sensing signal $V_{p2}$. Detection electrodes 15 receiving the first pressure sensing signal $V_{p1}$ are first pressure electrodes 15pa, and detection electrodes 15 receiving the second pressure sensing signal $V_{p2}$ are second pressure electrodes 15pb. The first pressure electrodes 15pa and the detection conductors 14 are configured to form a first capacitor structure Ca, the second pressure electrodes 15pb and the detection conductors 14 are configured to form a second capacitor structure Cb, and the first capacitor structure Ca and the second capacitor structure Cb are connected in series. A capacitance between the first pressure electrodes 15pa and the second pressure electrodes 15pb is obtained. A capacitance change value between the first pressure electrodes 15pa and the second pressure electrodes 15pb is obtained, based on the capacitance between the first pressure electrodes 15pa and the second pressure electrodes 15pb and a preset first capacitance, as a pressure capacitance change value ΔCp. And a pressure signal is obtained based on the pressure capacitance change value ΔCp, to realize pressure sensing. In the touch sensing stage, a first touch sensing signal is provided to a part of the multiple detection electrodes 15, and a second touch sensing signal is provided to the remaining part of the multiple detection electrodes 15. Detection electrodes 15 receiving the first touch sensing signal are first touch electrodes, and detection electrodes 15 receiving the second touch sensing signal are second touch electrodes. And a self-capacitance detection is performed on the first touch electrodes or the second touch electrodes, or a mutual capacitance detection is performed on the first touch electrodes and the second touch electrodes, to realize touch sensing.

It should be noted that, the pressure sensing stage may be triggered by a pressure sensing instruction, or the touch sensing stage may be triggered by a touch sensing instruction.

For example, the pressure sensing instruction or the touch sensing instruction may be generated by a booting apparatus. When an electronic device with the touch apparatus is powered on, the pressure sensing instruction is provided to trigger the pressure sensing stage, or the touch sensing instruction is provided to trigger the touch sensing stage.

Or, the pressure sensing instruction or the touch sensing instruction may also be generated by an application program in the electronic device. When the application program is selected or in use, the pressure sensing instruction or the touch sensing instruction may be generated to trigger the pressure sensing stage or the touch sensing stage.

It should be noted that, it is merely an example that the pressure sensing instruction or the touch sensing instruction is adopted to trigger the pressure sensing stage or the touch sensing stage. In other embodiments of the present disclosure, the triggering for pressure sensing or touch sensing stage may be realized otherwise. In addition, in other embodiments of the present disclosure, a timing device may also be provided to periodically trigger the pressure sensing stage or the touch sensing stage at a certain frequency, to realize a control function through information of a pressure and a touch.

Figure 12:
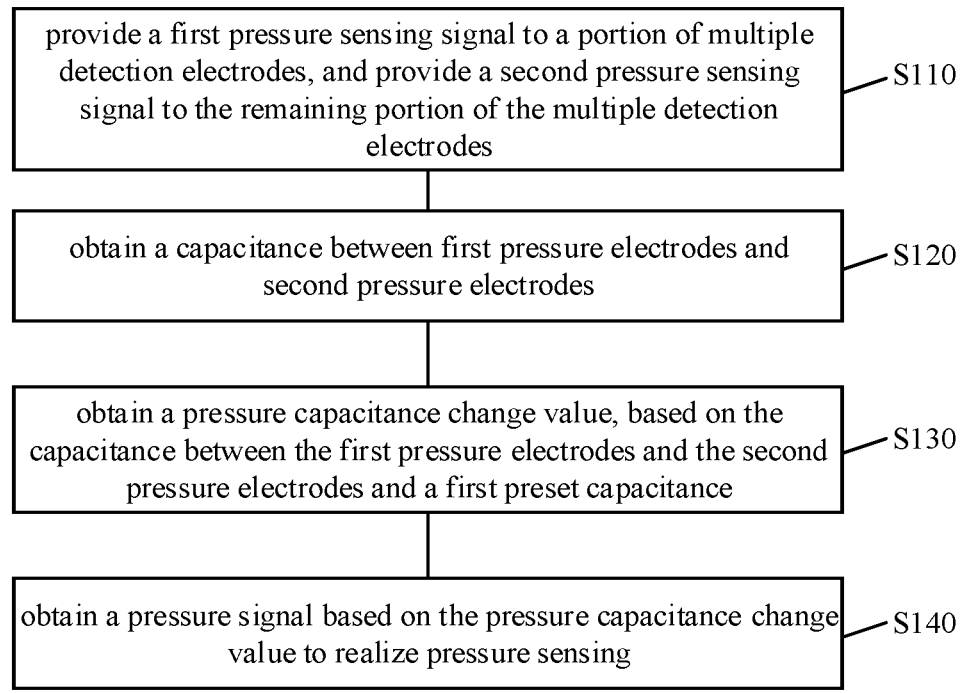
FIG. 12 is a flow chart of a pressure sensing stage of a drive method for a touch apparatus to realize pressure sensing according to an embodiment of the present disclosure.

Specifically, referring to FIG. 12, FIG. 12 is a flow chart of a pressure sensing stage of a drive method adopted by a touch apparatus shown in FIG. 3.

Referring to step S110 in FIG. 12, first, a first pressure sensing signal $V_{p1}$ is provided to a part of the multiple detection electrodes 15, and a second pressure sensing signal $V_{p2}$ is provided to the remaining part of the multiple detection electrodes 15.

The first pressure sensing signal $V_{p1}$ is not equal to the second pressure sensing signal $V_{p2}$. Detection electrodes 15 receiving the first pressure sensing signal $V_{p1}$ are first pressure electrodes 15pa, and detection electrodes 15 receiving the second pressure sensing signal $V_{p2}$ are second pressure electrodes 15pb. The first pressure electrodes 15pa and the detection conductors 14 are configured to form a first capacitor structure Ca, the second pressure electrodes 15pb and the detection conductors 14 are configured to form a second capacitor structure Cb, and the first capacitor structure Ca and the second capacitor structure Cb are connected in series.

Referring to FIG. 3, in the embodiment, the touch apparatus further includes: a detection module 10, which includes three successive rows of detection electrodes 15. The detection conductors 14 each include one or multiple detection wires extending in a column direction.

The step of providing the first pressure sensing signal $V_{p1}$ to the part of the multiple detection electrodes 15, and providing the second pressure sensing signal $V_{p2}$ to the remaining part of the multiple detection electrodes 15 includes: providing the first pressure sensing signal $V_{p1}$ to two rows of detection electrodes 15 in the detection module, and providing the second pressure sensing signal $V_{p2}$ to the remaining row of detection electrodes 15 in the detection module.

Specifically, in the embodiment, the first pressure sensing signal $V_{p1}$ is provided to two rows of detection electrodes 15 located on both sides of the detection module, and the second pressure sensing signal $V_{p2}$ is provided to one row of detection electrodes 15 located in the middle of the detection module.

The step of providing the first pressure sensing signal $V_{p1}$ to the first pressure electrodes 15pa renders the first pressure electrodes 15pa at a first potential. The step of providing the second pressure sensing signal $V_{p2}$ to the second pressure electrodes 15pb renders the second pressure electrodes 15pb at a second potential. The second pressure sensing signal $V_{p2}$ may be a grounding signal, that is to say, the step of providing the second pressure sensing signal $V_{p2}$ to the second pressure electrodes 15pb renders the second pressure electrodes 15pb grounded.

It should be noted that, in the embodiment, the multiple detection electrodes 15 are electrodes of an integrated display touch apparatus (Integrated Display Control). Therefore, the multiple detection electrodes 15 may be configured in a full-drive mode, a high-impedance (High-Z) mode, and a ground (GND) mode. In the step of providing the first pressure sensing signal $V_{p1}$ to the part of the multiple detection electrodes 15 and providing the second pressure sensing signal $V_{p2}$ to the remaining part of the multiple detection electrodes 15, the part of the multiple detection electrodes 15 is configured in the full-drive mode, and the remaining part of the multiple detection electrodes 15 is configured in the ground mode.

Then, referring to step S120 in FIG. 12, a capacitance between the first pressure electrodes 15pa and the second pressure electrodes 15pb is obtained.

In the embodiment, the second pressure sensing signal $V_{p2}$ is a grounding signal, that is to say, the second pressure electrodes 15pb are grounded. Accordingly, in the step of obtaining the capacitance between the first pressure electrodes 15pa and the second pressure electrodes 15pb, a capacitance to ground of the first pressure electrodes 15pa is obtained.

Then, referring to step S130 in FIG. 12, a capacitance change value between the first pressure electrodes 15pa and the second pressure electrodes 15pb based on the capacitance between the first pressure electrodes 15pa and the second pressure electrodes 15*pb* and a preset first capacitance is obtained as a pressure capacitance change value ΔCp.

The first capacitance is a capacitance of a capacitor structure between the first pressure electrodes 15*pa* and the second pressure electrodes 15*pb*, when no external pressure is applied.

Based on the capacitance between the first pressure electrodes 15*pa* and the second pressure electrodes 15*pb* and the first capacitance, the capacitance change value between the first pressure electrodes 15*pa* and the second pressure electrodes 15*pb* is obtained as the pressure capacitance change value ΔCp.

As shown in FIG. 3, the first pressure electrodes 15*pa* and the detection conductors 14 form the first capacitor structure Ca, the second pressure electrodes 15*pb* and the detection conductors 14 form the second capacitor structure Cb.

Since the first pressure sensing signal Vp1 is not equal to the second pressure sensing signal Vp2, a potential of the first pressure electrodes 15*pa* is not equal to that of the second pressure electrodes 15*pb*. The first capacitor structure Ca and the second capacitor structure Cb are connected in series to form the capacitor structure between the first pressure electrodes 15*pa* and the second pressure electrodes 15*pb*.

When an external pressure is applied, distances between the detection conductors 14 and the first pressure electrodes 15*pa*, and between the detection conductors 14 and the second pressure electrodes 15*pb*, are changed, and capacitances of the first capacitor structure Ca and the second capacitor structure Cb are changed, thereby changing the capacitance of the capacitor structure between the first pressure electrodes 15*pa* and the second pressure electrodes 15*pb*.

Specifically, when the external pressure changes the capacitances of the first capacitor structure Ca and the second capacitor structure Cb by ΔCa and ΔCb, respectively, the capacitance of the capacitor structure, which is formed by connecting the first capacitor structure Ca and the second capacitor structure Cb in series, between the first pressure electrodes 15*pa* and the second pressure electrodes 15*pb* changes by ΔC=(ΔCa*ΔCb)/(ΔCa+ΔCb).

Then, when external pressure changes the capacitances of the first capacitor structure Ca and the second capacitor structure Cb by ΔCa and ΔCb, respectively, the pressure capacitance change value ΔCp=(ΔCa*ΔCb)/(ΔCa+ΔCb) may be obtained.

Specifically, in the embodiment, in the step of obtaining the capacitance between the first pressure electrodes 15*pa* and the second pressure electrodes 15*pb*, the capacitance to ground of the first pressure electrodes 15*pa* is obtained. Accordingly, in the step of obtaining the capacitance change value between the first pressure electrodes 15*pa* and the second pressure electrodes 15*pb* as the pressure capacitance change value ΔCp based on the capacitance between the first pressure electrodes 15*pa* and the second pressure electrodes 15*pb* and the preset first capacitance, the pressure capacitance change value ΔCp is obtained based on the capacitance to ground of the first pressure electrodes 15*pa* and the first capacitance.

Then, referring to step S140 in FIG. 12, a pressure signal is obtained based on the pressure capacitance change value ΔCp, to realize pressure sensing.

In the embodiment, the pressure signal is generated based on the pressure capacitance change value ΔCp. Then, it is determined whether a pressure exists is performed through comparing a magnitude of the pressure signal with a preset pressure threshold. Specifically, the step of realizing pressure sensing includes: comparing the magnitude of the pressure signal with the preset pressure threshold, and determining a pressure exists in a case that the magnitude of the pressure signal is greater than the pressure threshold. In an electronic device with the touch apparatus, an application may be developed based on the determination whether a pressure exists, to realize the utilization of pressure dimension information.

It should be noted that, it is only an example that in the embodiment, pressure sensing is realized through determining whether a pressure exists. In other embodiments of the present disclosure, pressure sensing may also be realized through sensing the magnitude of the pressure. Different applications may be developed for an electronic device with the touch apparatus based on pressures with different magnitudes, to realize further development and utilization of the pressure dimension information.

In addition to sensing the pressure, the touch apparatus adopting the driving method of the present disclosure can also sense touch to achieve control.

Figure 13:
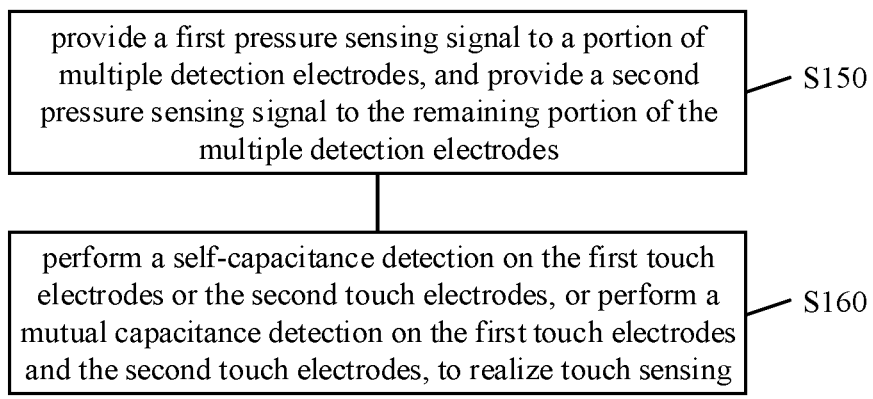
FIG. 13 is a flow chart of a touch sensing stage of a drive method for a touch apparatus to realize pressure sensing according to an embodiment of the present disclosure.

Referring to FIG. 13, FIG. 13 is a flow chart of a touch sensing stage of a drive method adopted by the touch apparatus shown in FIG. 3.

Firstly, referring to step S150 in FIG. 13, a first touch sensing signal is provided to a part of the multiple detection electrodes 15, and a second touch sensing signal is provided to the remaining part of the multiple detection electrodes. Detection electrodes 15 receiving the first touch sensing signal are first touch electrodes, and detection electrodes 15 receiving the second touch sensing signal are second touch electrodes.

Specifically, the first sensing signal and the second sensing signal are generated. The first touch sensing signal is provided to the part of the multiple detection electrodes 15 (the first touch electrodes), and the second touch sensing signal is provided to the remaining part of the multiple detection electrodes (the second touch electrodes). The first touch electrodes are rendered at a first potential by the first touch sensing signal, and the second touch electrodes are rendered at a second potential by the second touch sensing signal.

It should be noted that, in the embodiment, the first touch sensing signal is equal to the second touch sensing signal. Therefore in the touch sensing stage, a potential of the first touch electrodes is equal to that of the second touch electrodes.

Then, referring to step S160 in FIG. 13, a self-capacitance detection is performed on the first touch electrodes or the second touch electrodes, or a mutual capacitance detection is performed on the first touch electrodes and the second touch electrodes, to realize touch sensing.

A touch screen of a mobile phone is described as an example of the touch apparatus. When the touch screen is touched with a finger, the multiple detection electrodes 15 are grounded through the human body as the human body is grounded. Therefore, touch sensing can be realized by performing a self-capacitance detection on the multiple detection electrodes 15, or performing a mutual capacitance detection on the first touch electrodes and the second touch electrodes.

It should be noted that, pressure sensing or touch sensing may be repeatedly performed at a certain frequency, thereby realizing a scan on pressure information and touch information, and improving the user experience of the touch apparatus.

Referring to FIG. 6, FIG. 6 is a schematic structural diagram of a touch apparatus to which a drive method for a touch apparatus to realize pressure sensing according to an embodiment of the present disclosure is applied.

The similarities between the embodiment and the previous embodiment are not repeated herein. The differences between the embodiment and the first embodiment are described shown in FIG. 6. The touch apparatus further includes: a detection module 20, which includes three successive columns of detection electrodes 25. The detection conductors 24 each include one or multiple detection wires expending in a row direction.

Figure 14:
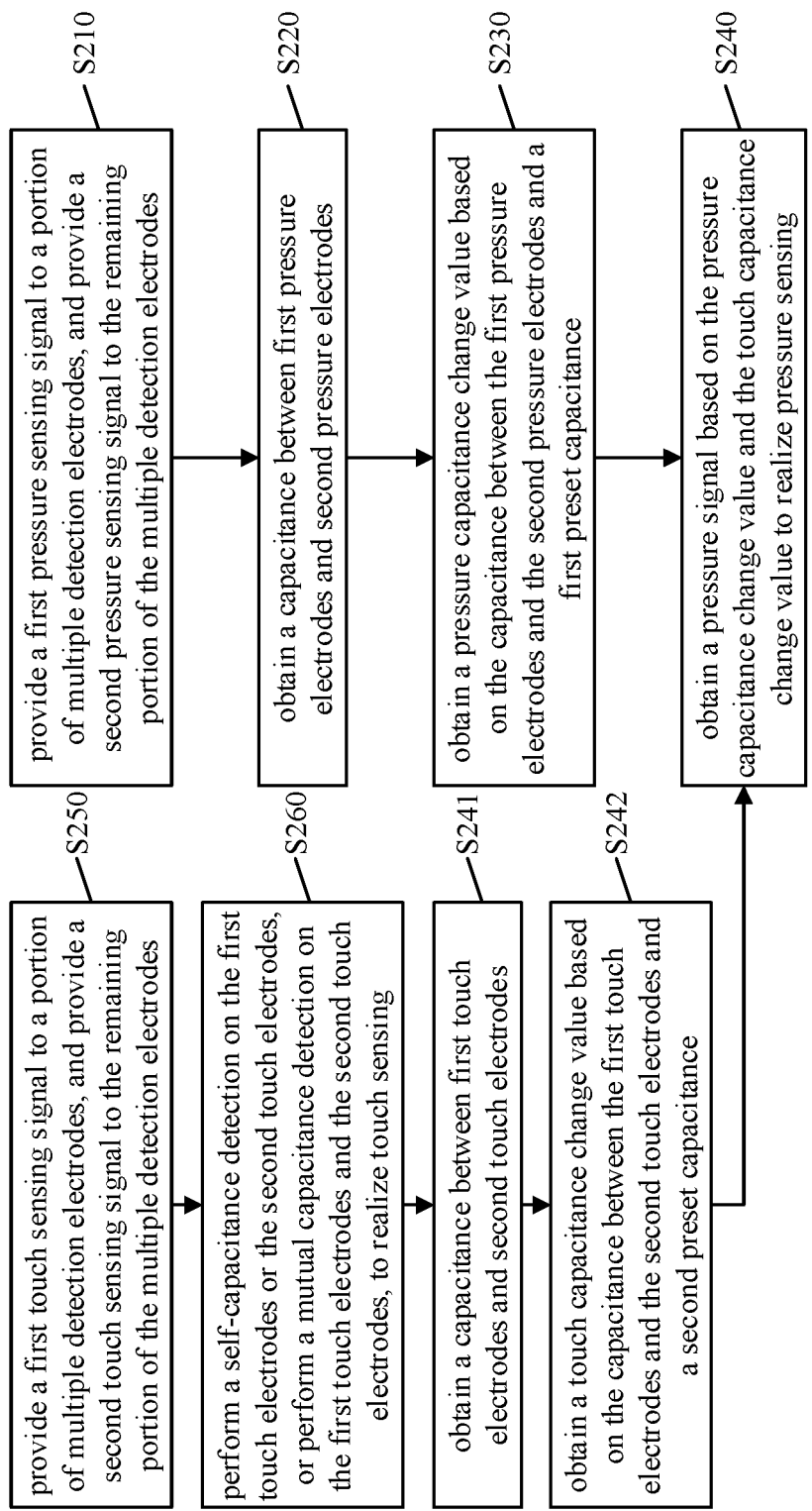
FIG. 14 is a flow chart of a drive method for a touch apparatus to realize pressure sensing according to an embodiment of the present disclosure.

Referring to FIG. 14, FIG. 14 is a flow chart of a drive method adopted by the touch apparatus shown in FIG. 6.

In the embodiment, the step S210 of providing a first pressure sensing signal $V_{p1}$ to a part of the multiple detection electrodes 25 and providing a second pressure sensing signal $V_{p2}$ to the remaining part of the multiple detection electrodes 25 includes: providing the first pressure sensing signal $V_{p1}$ to two columns of detection electrodes 25 in the detection module 20, and providing the second pressure sensing signal $V_{p2}$ to the remaining column of detection electrodes 25 in the detection module 20.

Specifically, the first pressure sensing signal $V_{p1}$ is provided to two columns of detection electrodes 25 located on two sides of the detection module 20, and the second pressure sensing signal $V_{p2}$ is provided to a column of detection electrodes 25 located in the middle of the detection module 20.

That is to say, in the embodiment, a detection module 20 includes two columns of first pressure electrodes 25pa and one column of second pressure electrodes 25pb, and the two columns of first pressure electrodes 25pa are located on both sides of the one column of second pressure electrodes 25pb.

In addition, in the embodiment, the multiple detection electrodes 25 are electrodes of a self-capacitance touch apparatus, so in the step of providing the first pressure sensing signal $V_{p1}$ to a part of the multiple detection electrodes 25 and providing the second pressure sensing signal $V_{p2}$ to the remaining part of the multiple detection electrodes 25, the part of the multiple detection electrodes 25 is configured in a waterproof mode, and the remaining part of the multiple detection electrodes 25 is configured in a non-waterproof mode.

In order to improve the accuracy for pressure sensing, in the embodiment, in the touch sensing stage, the touch method further includes: performing step S241, in which a capacitance between the first touch electrodes and the second touch electrodes is obtained; and then performing step S242, in which a capacitance change value between the first touch electrodes and the second touch electrodes is obtained based on the capacitance between the first touch electrodes and the second touch electrodes and a preset second capacitance as a touch capacitance change value.

The step S240 of obtaining a pressure change value includes: obtaining a pressure signal based on the pressure capacitance change value ΔCp and the touch capacitance change value. Thus, in a process of pressure sensing, the interference of pressure sensing caused by finger touch can be avoided, thereby improving the accuracy of pressure sensing.

Referring to FIG. 8, FIG. 8 is a schematic structural diagram of a touch apparatus to which a drive method according to an embodiment of the present disclosure is applied.

In the embodiment, the touch apparatus further includes: a detection module 30, which includes 3×3 detection electrodes 35. And a detection conductor 34 includes one or multiple first detection wires across three columns of the detection electrodes 35 in the detection module 30 in a row direction, and one or multiple second detection wires across three rows of the detection electrodes 35 in the detection module 30 in a column direction.

In the embodiment, the step of providing a first pressure sensing signal $V_{p1}$ to a part of the detection electrodes 35, and providing a second pressure sensing signal $V_{p2}$ to the remaining part of the detection electrodes 35 includes: providing the second pressure sensing signal $V_{p2}$ to one of the detection electrodes 35 in the detection module 30, and providing the first pressure sensing signal $V_{p1}$ to the remaining of the detection electrodes 35 in the detection module 30.

Specifically, the second pressure sensing signal $V_{p2}$ is provided to one of the detection electrodes 35 located in the center of the detection module 30, and the first pressure sensing signal $V_{p1}$ is provided to detection electrodes 35 located in the surrounding of the detection module 30.

That is to say, in the embodiment, every nine detection electrodes 35 form a 3×3 matrix. The nine detection electrodes 35 include eight first pressure electrodes 35pa and one second pressure electrode 35pb, and the eight first pressure electrodes 35pa are located around the one second pressure electrode 35pb.

The detection electrodes 35 are drive electrodes or reception electrodes of a mutual capacitance touch apparatus. The reception electrodes are the first pressure electrodes 35pa, and the drive electrodes are the second pressure electrodes 35pb. In the step of providing a first pressure sensing signal $V_{p1}$ to a part of the detection electrodes 35, and providing a second pressure sensing signal $V_{p2}$ to the remaining part of the detection electrodes 35, the first pressure sensing signal $V_{p1}$ is provided to the reception electrodes, and the second pressure sensing signal $V_{p2}$ is provided to the drive electrodes.

Referring to FIG. 9, FIG. 9 is a schematic structural diagram of a touch apparatus to which a drive method according to an embodiment of the present disclosure is applied.

The similarities between the embodiment and the foregoing embodiments are not repeated herein. The differences between the embodiment and the foregoing embodiments are described as follows. The touch apparatus further includes: discharge electrodes 47 connected to the detection conductors 44 for releasing electronic charges. A stage in which multiple detection electrodes 45 and the detection conductors 44 perform neither pressure sensing nor touch sensing is defined as an idle stage. The discharge electrodes 47 are suspended during a pressure sensing stage or a touch sensing stage, and grounded during the idle stage.

In the pressure sensing stage or the touch sensing stage, the detection conductors 44 are in a suspended state. There is a charge accumulation phenomenon in the suspended detection conductors 44, thereby affecting the practical function of the touch apparatus. A touch screen of a mobile phone is described as an example, when there is a charge accumulation phenomenon in the suspended detection conductors 44 of the touch screen of the mobile phone, a display function of the touch screen of the mobile phone is affected.

As shown in FIG. 9, in the embodiment, the detection conductors each 44 include one or multiple detection wires extending in a column direction. The discharge electrodes 47 are located, in a row direction, at one or both sides of an array formed by the multiple detection electrodes 45, and are each connected with the one or multiple detection wires. When the discharge electrodes 47 are grounded in the idle stage, the detection conductors 44 can release the accumulated charges to the ground through the discharge electrodes 47.

The drive method further includes: grounding the discharge electrodes in the idle stage. Specifically, in the pressure sensing stage or the touch sensing stage, a suspending signal is provided to the discharge electrodes 47, so that the discharge electrodes 47 are suspended. In the idle stage, a grounding signal is provided to the discharge electrodes, so that the discharge electrodes are grounded.

It should be noted that, it is only an example that the discharge electrodes 47 are located, in a row direction, at one or both sides of the array formed by the multiple detection electrodes 45. In other embodiments of the present disclosure, the discharge electrodes 47 may also be set on other positions of the touch apparatus. In a case that the detection conductors 44 each include one or multiple detection wires extending in a row direction, the discharge electrodes 47 are located, in a column direction, at one or both sides of the array formed by the multiple detection electrodes 45, and are each connected with the one or multiple detection wires.

Generally, according to the present disclosure, in a pressure detection stage, a first pressure sensing signal is provided to a part of the multiple detection electrodes, a second pressure sensing signal is provided to the retaining part of the multiple detection electrodes, and the first pressure sensing signal is not equal to the second pressure sensing signal. The first pressure electrodes receiving the first pressure sensing signal and the second pressure electrodes receiving the second pressure sensing signal form a capacitor structure. Through detecting a capacitance change of the capacitor structure, distance changes between the detection conductor and the first pressure electrodes and between the detection conductor and the second pressure electrodes are detected, to realize pressure sensing. In addition to touch sensing, the technical solutions according to the present disclosure can realize pressure sensing through providing the voltage change to the multiple detection electrodes, thereby realizing a function integration of touch sensing and pressure sensing without widely changing the device structure, effectively expanding the control capability of the touch apparatus, and further improving the user experience of the touch apparatus.

The foregoing embodiments according to the present disclosure are disclosed above, but are not intended to limit the present disclosure. Those skilled in the art may make various changes and modifications without departing from the spirit and scope of the present disclosure. Therefore, the protection scope of the present disclosure should be limited by the scope of the patent claims.

The invention claimed is:

1. A drive method for a touch apparatus to realize pressure sensing, wherein,
the touch apparatus comprises: a detection conductor and a plurality of detection electrodes arranged in an array, the plurality of detection electrodes and the detection conductor are arranged opposite each other to form a capacitor structure for sensing a touch and a pressure; a stage in which the plurality of detection electrodes and the detection conductor perform pressure sensing is defined as a pressure sensing stage, and a stage in which the plurality of detection electrodes and the detection conductor perform touch sensing is defined as a touch sensing stage; and the detection conductor is in a suspended state during the pressure sensing stage;
the drive method comprises:
in the pressure sensing stage,
providing a first pressure sensing signal to a part of the plurality of detection electrodes, and providing a second pressure sensing signal to the remaining part of the plurality of detection electrodes, wherein, the first pressure sensing signal is different from the second pressure sensing signal, detection electrodes receiving the first pressure sensing signal are first pressure electrodes, detection electrodes receiving the second pressure sensing signal are second pressure electrodes, the first pressure electrodes and the detection conductor are configured to form a first capacitor structure, the second pressure electrodes and the detection conductor are configured to form a second capacitor structure, and the first capacitor structure and the second capacitor structure are connected with each other in series;
obtaining a capacitance between the first pressure electrodes and the second pressure electrodes, comparing the capacitance between the first pressure electrodes and the second pressure electrodes with a preset first capacitance, and obtaining a capacitance change value between the first pressure electrodes and the second pressure electrodes as a pressure capacitance change value; and
obtaining a pressure signal based on the pressure capacitance change value, to realize pressure sensing; and
in the touch sensing stage,
providing a first touch sensing signal to a part of the plurality of detection electrodes, and providing a second touch sensing signal to the remaining part of the plurality of detection electrodes, wherein, detection electrodes receiving the first touch sensing signal are first touch electrodes, and detection electrodes receiving the second touch sensing signal are second touch electrodes; and
performing a self-capacitance detection on the first touch electrodes or the second touch electrodes, or performing a mutual capacitance detection on the first touch electrodes and the second touch electrodes, to realize touch sensing.

2. The drive method according to claim 1, further comprising: obtaining a capacitance between the first touch electrodes and the second touch electrodes, and obtaining a capacitance change value between the first touch electrodes and the second touch electrodes as a touch capacitance change value based on the capacitance between the first touch electrodes and the second touch electrodes and a preset second capacitance;
the obtaining a pressure signal comprises: obtaining the pressure signal based on the pressure capacitance change value and the touch capacitance change value.

3. The drive method according to claim 1, wherein, the step of realizing pressure sensing comprises: determining whether a magnitude of the pressure signal is greater than a preset pressure threshold, and determining that a pressure exists in a case that the magnitude of the pressure signal is greater than the preset pressure threshold.

4. The drive method according to claim 1, wherein,
in the step of providing the first pressure sensing signal to the first pressure electrodes and providing the second pressure sensing signal to the second pressure electrodes, the first pressure sensing signal is provided to the first pressure electrodes, to ground the second pressure electrodes;
the step of obtaining the capacitance between the first pressure electrodes and the second pressure electrodes comprises: detecting a capacitance to ground of the first pressure electrodes; and the step of obtaining the pressure capacitance change value comprises: comparing the capacitance to ground of the first pressure electrodes with the preset first capacitance, to obtain the pressure capacitance change value.

5. The drive method according to claim 1, wherein, in the step of providing the first touch sensing signal to the first touch electrodes and providing the second touch sensing signal to the second touch electrodes, the first touch sensing signal is equal to the second touch sensing signal.

6. The drive method according to claim 1, wherein,
the touch apparatus further comprises: discharge electrodes connected to the detection conductor for releasing electronic charges; and a stage in which the plurality of detection electrodes and the detection conductor perform neither pressure sensing nor touch sensing is defined as an idle stage; and
the drive method further comprises: suspending the discharge electrodes during the pressure sensing stage or the touch sensing stage, and grounding the discharge electrodes during the idle stage.

7. A drive circuit for a touch apparatus to realize pressure sensing, wherein,
the touch apparatus comprises: a detection conductor and a plurality of detection electrodes arranged in an array, the plurality of detection electrodes and the detection conductor are arranged opposite each other to form a capacitor structure for sensing a touch and a pressure, a stage in which the plurality of detection electrodes and the detection conductor perform pressure sensing is defined as a pressure sensing stage, a stage in which the plurality of detection electrodes and the detection conductor perform touch sensing is defined as a touch sensing stage, and the detection conductor is in a suspended state during the pressure sensing stage; and
the drive circuit comprises:
a pressure sensing module, configured to provide a first pressure sensing signal to a part of the plurality of detection electrodes, and provide a second pressure sensing signal to the remaining part of the plurality of detection electrodes, wherein, the first pressure sensing signal is different from the second pressure sensing signal, detection electrodes receiving the first pressure sensing signal are first pressure electrodes, detection electrodes receiving the second pressure sensing signal are second pressure electrodes, the first pressure electrodes and the detection conductor are configured to form a first capacitor structure, the second pressure electrodes and the detection conductor are configured to form a second capacitor structure, and the first capacitor structure and the second capacitor structure are connected with each other in series; further configured to obtain a capacitance between the first pressure electrodes and the second pressure electrodes, compare the capacitance between the first pressure electrodes and the second pressure electrodes with a preset first capacitance, and obtain a capacitance change value between the first pressure electrodes and the second pressure electrodes as a pressure capacitance change value; and further configured to obtain a pressure signal based on the pressure capacitance change value, to realize pressure sensing;
a touch sensing module, configured to provide a first touch sensing signal to a part of the plurality of detection electrodes, and provide a second touch sensing signal to the remaining part of the plurality of detection electrodes, wherein, detection electrodes receiving the first touch sensing signal are first touch electrodes, and detection electrodes receiving the second touch sensing signal are second touch electrodes; and further configured to perform a self-capacitance detection on the first touch electrodes or the second touch electrodes, or perform a mutual capacitance detection on the first touch electrodes and the second touch electrodes, to realize touch sensing; and
a control module, configured to in the pressure sensing stage, control the pressure sensing module to: provide the first pressure sensing signal to the first pressure electrodes, provide the second pressure sensing signal to the second pressure electrodes, obtain the capacitance between the first pressure electrodes and the second pressure electrodes and the pressure capacitance change value, obtain the pressure signal based on the pressure capacitance change value, and realize pressure sensing based on the pressure signal; and configured to in the touch sensing stage, control the touch sensing module to: provide the first touch sensing signal to the first touch electrodes, provide the second touch sensing signal to the second touch electrodes, and perform a self-capacitance detection on the first touch electrodes or the second touch electrodes, or perform a mutual capacitance detection on the first touch electrodes and the second touch electrodes, to realize touch sensing.

8. The drive circuit according to claim 7, wherein,
the touch sensing module is further configured to obtain the capacitance between the first touch electrodes and the second touch electrodes, and obtain the capacitance change value between the first touch electrodes and the second touch electrodes as a touch capacitance change value based on the capacitance between the first touch electrodes and the second touch electrodes and a preset second capacitance; and
the pressure sensing module is further connected with the touch sensing module, and is configured to obtain the touch capacitance change value obtained by the touch sensing module, and obtain the pressure signal based on the pressure capacitance change value and the touch capacitance change value.

9. The drive circuit according to claim 7, wherein the pressure sensing module compares a magnitude of the pressure signal with a preset pressure threshold, and determines that a pressure exists in a case that the magnitude of the pressure signal is greater than the preset pressure threshold.

10. The drive circuit according to claim 7, wherein the pressure sensing module comprises:
a pressure drive unit, configured to provide the first pressure sensing signal to the first pressure electrodes, and provide the second pressure sensing signal to the second pressure electrodes; and
a pressure detection unit, configured to obtain the capacitance between the first pressure electrodes and the second pressure electrodes, and obtain the capacitance change value between the first pressure electrodes and the second pressure electrodes as the pressure capacitance change value based on the capacitance between the first pressure electrodes and the second pressure electrodes and the preset first capacitance; and further configured to obtain the pressure signal based on the pressure capacitance change value, to realize pressure sensing.

11. The drive circuit according to claim 10, wherein the pressure drive unit comprises:

a first driver, configured to generate the first pressure sensing signal, and provide the first pressure sensing signal to the first pressure electrodes; and a second driver, configured to generate the second pressure sensing signal, and provide the second pressure sensing signal to the second pressure electrodes.

12. The drive circuit according to claim 10, wherein the pressure detection unit comprises:

a pressure capacitance detector, configured to obtain the capacitance between the first pressure electrodes and the second pressure electrodes;

a pressure capacitance comparator, configured to obtain the capacitance change value between the first pressure electrodes and the second pressure electrodes as the pressure capacitance change value based on the capacitance between the first pressure electrodes and the second pressure electrodes and the preset first capacitance;

and a pressure detector, configured to obtain the pressure signal based on the pressure capacitance change value, to realize pressure sensing.

13. The drive circuit according to claim 12, wherein, the second pressure sensing signal is a grounding signal;

the pressure capacitance detector detects a capacitance to ground of the first pressure electrodes; and the pressure capacitance comparator obtains the pressure capacitance change value based on the capacitance to ground of the first pressure electrodes and the first capacitance.

14. The drive circuit according to claim 7, wherein the touch detection module comprises:

a touch drive unit, configured to provide the first touch sensing signal to the first touch electrodes, and provide the second touch sensing signal to the second touch electrodes; and a touch detection unit, configured to perform a self-capacitance detection on the first touch electrodes or the second touch electrodes, or perform a mutual capacitance detection on the first touch electrodes and the second touch electrodes, to realize touch sensing.

15. The drive circuit according to claim 12, wherein, the touch sensing module further comprises:

a touch capacitance detector, configured to obtain the capacitance between the first touch electrodes and the second touch electrodes; and a touch capacitance comparator, configured to obtain the capacitance change value between the first touch electrodes and the second touch electrodes as the touch capacitance change value based on the capacitance between the first touch electrodes and the second touch electrodes and the preset second capacitance; and the pressure detector is further configured to obtain the pressure signal based on the pressure capacitance change value and the touch capacitance change value, to realize pressure sensing.

16. The drive circuit according to claim 12, wherein the pressure detector comprises: a determining element, configured to compare a magnitude of the pressure signal with a preset pressure threshold, and determine that a pressure exists in a case that the magnitude of the pressure signal is greater than the preset pressure threshold.

17. The drive circuit according to claim 7, wherein the control module comprises:

a pressure control unit, configured to in the pressure sensing stage, control the pressure sensing module to: provide the first pressure sensing signal to the first pressure electrodes, provide the second pressure sensing signal to the second pressure electrodes, obtain the capacitance between the first pressure electrodes and the second pressure electrodes and the pressure capacitance change value, and obtain the pressure signal based on the pressure capacitance change value, to realize pressure sensing; and a touch control unit, configured to in the touch sensing stage, control the touch sensing module to: provide the first touch sensing signal to the first touch electrodes, provide the second touch sensing signal to the second touch electrodes, and perform a self-capacitance detection on the first touch electrodes or the second touch electrodes, or perform a mutual capacitance detection on the first touch electrodes and the second touch electrodes, to realize touch sensing.

18. The drive circuit according to claim 7, wherein, the touch apparatus further comprises discharge electrodes connected to the detection conductor for releasing electronic charges;

a stage in which the plurality of detection electrodes and the detection conductor perform neither pressure sensing nor touch sensing is defined as an idle stage; and the control module further comprises a discharge control unit, configured to suspend the discharge electrodes during the pressure sensing stage or the touch sensing stage, and ground the discharge electrodes during the idle stage.

19. The drive circuit according to claim 7, wherein the first touch sensing signal is equal to the second touch sensing signal.

20. A touch apparatus, comprising:

a first baseplate and a second baseplate, wherein the first baseplate and the second baseplate are arranged opposite each other;

a soft support, located between the first baseplate and the second baseplate, and configured to be deformed when the first baseplate or the second baseplate is subjected to an external pressure;

a detection conductor and a plurality of detection electrodes arranged in an array, located between the first baseplate and the second baseplate, wherein a distance between the detection conductor and the plurality of detection electrodes is changed when the soft support deformed; and the drive circuit according to claim 7.

* * * * *